US012604789B2

(12) United States Patent
Suzuki et al.

(10) Patent No.: US 12,604,789 B2
(45) Date of Patent: Apr. 21, 2026

(54) COMBINE AND METHOD FOR GENERATING TRAVEL ROUTE

(71) Applicant: Yanmar Holdings Co., Ltd., Osaka (JP)

(72) Inventors: Hidetaka Suzuki, Osaka (JP); Yuji Yamaguchi, Osaka (JP); Yasuto Nishii, Osaka (JP); Masaaki Murayama, Okayama (JP)

(73) Assignee: YANMAR HOLDINGS CO., LTD., Osaka (JP)

(*) Notice: Subject to any disclaimer, the term of this patent is extended or adjusted under 35 U.S.C. 154(b) by 193 days.

(21) Appl. No.: 18/039,953

(22) PCT Filed: Oct. 27, 2021

(86) PCT No.: PCT/JP2021/039600
§ 371 (c)(1),
(2) Date: Jun. 1, 2023

(87) PCT Pub. No.: WO2022/118570
PCT Pub. Date: Jun. 9, 2022

(65) Prior Publication Data
US 2024/0008383 A1 Jan. 11, 2024

(30) Foreign Application Priority Data
Dec. 2, 2020 (JP) ................................. 2020-200123

(51) Int. Cl.
*A01B 69/00* (2006.01)
*G05D 1/00* (2024.01)
(52) U.S. Cl.
CPC ......... *A01B 69/004* (2013.01); *G05D 1/0212* (2013.01)

(58) Field of Classification Search
None
See application file for complete search history.

(56) References Cited

U.S. PATENT DOCUMENTS 11,212,954 B2 * 1/2022 Maeder ................ A01B 69/008
2018/0209792 A1 * 7/2018 Suzukawa ............ G01C 21/005

FOREIGN PATENT DOCUMENTS

CN      206149874 U  *  5/2017
JP      11-137048 A     5/1999
(Continued)

OTHER PUBLICATIONS

Machine translation of Hiramatsu (WO-2017159615-A1) (Year: 2017).*
(Continued)

*Primary Examiner* — Navid Z. Mehdizadeh
*Assistant Examiner* — Sarah A. Mueller
(74) *Attorney, Agent, or Firm* — NORTON ROSE FULBRIGHT US LLP

(57)     ABSTRACT
A combine includes a control device configured to function as a travel route creating unit which creates a travel route corresponding to an agricultural field, and as an automatic operation control unit which controls automatic traveling and automatic reaping along the travel route. The travel route creating unit, when creating a travel route for carrying out automatic reaping travel in which, with respect to a work area with a plurality of rows in an agricultural field, a plurality of trips are made back and forth along a row direction, creates the travel route by setting, on the basis of a total number of rows, a maximum number of rows to be reaped, and a lower-limit number of rows to be reaped in the work area, the lower-limit number of rows to be reaped or more for each trip.

16 Claims, 15 Drawing Sheets

(56)     References Cited

FOREIGN PATENT DOCUMENTS

| | | | | | |
|---|---|---|---|---|---|
| JP | 1999-137048 | A | | 5/1999 | |
| JP | 2003-052216 | A | | 2/2003 | |
| JP | 2003-52216 | A | | 2/2003 | |
| JP | 2019-106926 | A | | 7/2019 | |
| JP | 2019-216744 | A | | 12/2019 | |
| JP | 6656047 | B2 | | 3/2020 | |
| JP | 2020099249 | A | * | 7/2020 | ........... G05D 1/0219 |
| JP | 2020-124149 | A | | 8/2020 | |
| WO | WO-2017159615 | A1 | * | 9/2017 | ........... A01B 69/001 |

OTHER PUBLICATIONS

Machine translation of Bai (CN-206149874-U) (Year: 2017).*
Machine translation of Sugumoto et al. (JP-2020099249-A) (Year: 2020).*
Japanese Office Action dated Dec. 26, 2023 issued in JP2020-200123.
International Search Report dated Nov. 30, 2021 issued in corresponding PCT Application PCT/JP2021/039600.

* cited by examiner

FIG. 11

COMBINE AND METHOD FOR GENERATING TRAVEL ROUTE

CROSS-REFERENCE TO RELATED APPLICATIONS

This application is a national stage application pursuant to 35 U.S.C. § 371 of International Application No. PCT/JP2021/039600, filed on Oct. 27, 2021, which claims priority under 35 U.S.C. § 119 to Japanese Patent Application No. 2020-200123 filed on Dec. 2, 2020, the disclosures of which are hereby incorporated by reference in their entireties.

TECHNICAL FIELD

This invention relates to a combine harvester that performs autonomous reaping travel through a travel route and generates the travel route by adjusting the number of reaping rows doe each of paths associated with a plurality of rows in a field, and relates to a travel route generation method for generating a travel route through which the combine harvester performs autonomous travel and autonomous reaping.

BACKGROUND ART

Conventionally, a combine harvester that reaps grain culms while traveling on a field can perform autonomous reaping travel through a preset travel route based on its own position information by using a satellite positioning system such as GPS.

For example, the combine harvester disclosed in Patent Literature 1 has a memory unit that stores a traveling work route composed of a plurality of straight travel routes which are turned and connected at a turn position and set in a field, and a travel control unit that causes, based on position information obtained by a positioning unit, a vehicle body to travel straight along the straight travel route, to turn at the turning position, and to travel straight along the next straight travel route, thereby controlling autonomous travel while performing reaping work.

Furthermore, the combine harvester disclosed in Patent Literature 2, including a reaping part that is liftably connected to the body of the combine harvester and an inclination angle sensor that detects an inclination angle of the body, uses GPS to obtain position information to enable autonomous traveling.

CITATION LIST

Patent Literature

Patent Literature 1: Japanese Unexamined Patent Application Publication No. 2019-216744
Patent Literature 2: Japanese Patent No. 6656047

DISCLOSURE OF INVENTION

Problems to be Solved by the Invention

When performing work for reaping crops from culms of grains planted in a plurality of rows in a field, for example, forward and backward reaping is performed by combine harvester so as to travel back and forth on a plurality of straight paths extending along a row direction and perform reaping work on a predetermined number of rows for each path. When performing autonomous reaping travel with such forward and backward reaping, the combine harvester previously generates a travel route for travelling back and forth on the plurality of straight paths. At this time, it is preferable that the reaping work for a respective path is performed with the maximum number of reaping rows of the reaping part of the combine harvester. Therefore, the travel route for autonomous reaping travel is basically generated by setting the maximum number of reaping rows to each path.

However, there may be a case in which the number of reaping rows less than the maximum number of reaping rows, such as one or two, is set to a path in the travel route because the total number of the plurality of rows in the field is not limited to a multiple of the maximum number of reaping rows. If the reaping work is performed with such a small number of rows, there is a risk of defective conditions such as reduced threshing accuracy, entrapment of discharged straw, etc., may occur due to reduction of a reaped amount and travelling on a reaped area.

Furthermore, for an autonomous reaping travel, a travel route for an entire field may be generated by splitting the plurality of rows in the middle along the row direction, generating travel routes for forward and backward reaping for split areas, respectively, and connecting the travel routes of the split areas. However, there may be a case in which the total number of the rows in a respective split area is not a multiple of the maximum number of reaping rows, and the number of reaping rows less than the maximum number of reaping rows, such as one or two, is set to a straight path in the travel route of the respective split area. As a result, there is a risk that defective conditions such as reduced threshing accuracy, entrapment of discharged straw, etc., may occur in the respective split area.

Although the approaches described in Patent Literature 1 and Patent Literature 2 can generate a travel route for autonomous reaping travel by a combine harvester, they do not take into account the number of reaping rows, which may cause the defective conditions described above.

It is an object of the present invention to provide a combine harvester and a travel route generation method, allowing for suppressing the defective conditions that may occur when reaping work is performed with a small number of rows.

Means for Solving the Problems

In order to solve the problems described above, a combine harvester of the present invention comprises a reaping part that reaps grain culms, a travel route generation unit that previously sets a lower limit number of reaping rows that is less than a maximum number of reaping rows of the reaping part, and sets a lower limit number of reaping rows or more to each path based on total number of rows in a work area, the maximum number of reaping rows, and the lower limit number of reaping rows when generating the travel route for autonomous reaping travel for the work area having a plurality of rows of a field in a manner traveling back and forth over plurality of paths along a row direction, thereby generating the travel route, and an automatic operation control unit that controls autonomous travel and autonomous reaping through the travel route.

In the combine harvester of the invention described above, preferably the travel route generation unit divides number of remaining rows, which is obtained when the lower limit number of reaping rows is set to a last path in the work area, by the maximum number of reaping rows, and if the number of excess rows that is obtained as a division result is within the difference between the maximum number of reaping rows and the lower limit number of reaping rows, the travel route generation unit sets the number of addition result rows obtained by adding the lower limit number of reaping rows and the number of excess rows to the last path while the travel route generation unit sets the maximum number of reaping rows to each remaining path other than the last path, thereby the travel route generation unit generates the travel route.

In the combine harvester of the invention described above, preferably, if the number of excess rows obtained as the division result exceeds the difference between the maximum number of reaping rows and the lower limit number of reaping rows, the travel route generation unit divides the number of remaining rows of a split area when the lower limit number of reaping rows is set to an adjustment path(s) that include the last path and a further path, by the maximum number of reaping rows, and if the number of excess rows that is obtained as the division result is within the difference between the maximum number of reaping rows and the lower limit number of reaping rows, the travel route generation unit 61 sets the number of addition result rows obtained by adding the lower limit number of reaping rows and the number of excess rows or the lower limit number of reaping rows to the adjustment path(s) while setting the maximum number of reaping rows to each remaining path, thereby the travel route generation unit generates the travel route.

In the combine harvester of the invention described above, the travel route generation unit preferably includes a predetermined number of path(s) selected back from the last path in the adjustment path(s) as the further path.

In the combine harvester of the invention described above, preferably, the travel route generation unit regards the split areas which has been split according to a predetermined times of middle-splitting of the field as a work area, sets the maximum number of reaping rows to a middle-split path along the middle-splitting, and divides a number of remaining rows of the split area when the lower limit number of reaping rows is set to a last path of each split area, by the maximum number of reaping rows, and if the number of excess rows that is obtained as the division result is within the difference between the maximum number of reaping rows and the lower limit number of reaping rows, the travel route generation unit sets the number of addition result rows obtained by adding the lower limit number of reaping rows and the number of excess rows to the last path while the travel route generation unit sets the maximum number of reaping rows to each remaining path of the split area, thereby the travel route generation unit generates the travel route; and if the number of excess rows obtained as the division result exceeds the difference between the maximum number of reaping rows and the lower limit number of reaping rows, the travel route generation unit divides the number of remaining rows of the split area when the lower limit number of reaping rows is set to an adjustment path(s) that includes the last path and a further path, by the maximum number of reaping rows, and further if the number of excess rows that is obtained as the division result is within the difference between the maximum number of reaping rows and the lower limit number of reaping rows, the travel route generation unit sets the number of addition result rows obtained by adding the lower limit number of reaping rows and the number of excess rows or the lower limit number of reaping rows to the adjustment path(s) while the travel route generation unit sets the maximum number of reaping rows to each remaining path of the split area, thereby the travel route generation unit generates the travel route.

In the combine harvester of the invention described above, preferably, the travel route generation unit sets an even number of paths to the split area, thereby the travel route generation unit generates the travel route.

In order to solve the problems described above, a travel route generation method of the invention is a travel route generation method for generating a travel route on which a combine harvester performs autonomous travel and autonomous reaping, wherein a lower limit number of reaping rows that is less than a maximum number of reaping rows is previously set, and the lower limit number of reaping rows or more is set to each path based on total number of rows in a work area, the maximum number of reaping rows, and a lower limit number of reaping rows when generating the travel route for autonomous reaping travel for the work area having a plurality of rows of a field in a manner traveling back and forth over plurality of paths along a row direction, thereby the travel route is generated.

In the travel route generation method described above, preferably, number of remaining rows, which is obtained when the lower limit number of reaping rows is set to a last path in the work area, is divided by the maximum number of reaping rows, and if the number of excess rows that is obtained as a division result is within the difference between the maximum number of reaping rows and the lower limit number of reaping rows, the number of addition result rows obtained by adding the lower limit number of reaping rows and the number of excess rows is set to the last path while the maximum number of reaping rows is set to each remaining path other than the last path, thereby the travel route is generated.

In the travel route generation method of the invention described above, preferably, if the number of excess rows obtained as the division result exceeds the difference between the maximum number of reaping rows and the lower limit number of reaping rows, the number of remaining rows of a split area when the lower limit number of reaping rows is set to an adjustment path(s) that includes the last path and a further path, is divided by the maximum number of reaping rows, and if the number of excess rows that is obtained as the division result is within the difference between the maximum number of reaping rows and the lower limit number of reaping rows, the number of addition result rows obtained by adding the lower limit number of reaping rows and the number of excess rows or the lower limit number of reaping rows is set to the adjustment path(s) while the maximum number of reaping rows is set to each remaining path, thereby the travel route is generated.

In the travel route generation method according the invention described above, a predetermined number of path(s) selected back from the last path is preferably included in the adjustment path as the further path.

In the travel route generation method of the invention described above, preferably, the split areas which has been split according to a predetermined times of middle-splitting of the field is regarded as a work area, the maximum number of reaping rows is set to a middle-split path along the middle-splitting, and divides number of remaining rows of the split area when the lower limit number of reaping rows is set to a last path of each split area, by the maximum number of reaping rows, and if the number of excess rows that is obtained as the division result is within the difference between the maximum number of reaping rows and the lower limit number of reaping rows, number of addition result rows obtained by adding the lower limit number of reaping rows and the number of excess rows to the last path while the maximum number of reaping rows is set to each remaining path of the split area, thereby the travel route is generated; and if the number of excess rows obtained as the division result exceeds the difference between the maximum number of reaping rows and the lower limit number of reaping rows, the number of remaining rows of the split area when the lower limit number of reaping rows is set to an adjustment path(s) that include the last path and a further path, is divided the maximum number of reaping rows, and further if the number of excess rows that is obtained as the division result is within the difference between the maximum number of reaping rows and the lower limit number of reaping rows, the number of addition result rows obtained by adding the lower limit number of reaping rows and the number of excess rows or the lower limit number of reaping rows is set to the adjustment path(s) while the maximum number of reaping rows is set to each remaining path of the split area, thereby the travel route is generated.

In the travel route generation method of the invention described above, preferably, an even number of paths is set to the split area, thereby the travel route is generated.

Effect of the Invention

According to the present invention, a combine harvester and a travel route generation method are provided, which allow for suppressing the defective conditions that occur when the reaping work is performed with a small number of rows.

BRIEF DESCRIPTION OF DRAWINGS

FIG. 11 is a plan view illustrating a field of a second example of the combine harvester according to the exemplary embodiment of the present invention, together with a travel route.

DESCRIPTION OF EMBODIMENTS

A combine harvester 1 according to an exemplary embodiment of the present invention will be described. The combine harvester 1 travels on a work target field by automatic operation or manual operation, and performs work such as reaping for harvesting crops from culms of grains planted in a plurality of rows in the field. The combine harvester 1 is configured to perform, for example, an automatic work in which steering is controlled by automatic driving while the traveling speed is controlled in response to a manual operation, or an unmanned operation in which the steering and the traveling speed are controlled by the automatic driving, making it possible to autonomously travel, turn, and work in the field.

The combine harvester 1 performs reaping work on a plurality of rows of grain culms while traveling through one path that includes rows within the maximum number of reaping rows. The combine harvester 1 is configured, for example, as a 6-row reaping type with the maximum number of reaping rows is six or a 7-row reaping type with the maximum number of reaping rows is seven. Here, the exemplary embodiment is described on a 6-row reaping combine harvester 1, although the present invention does not limit the maximum number of reaping rows.

Figure 1:
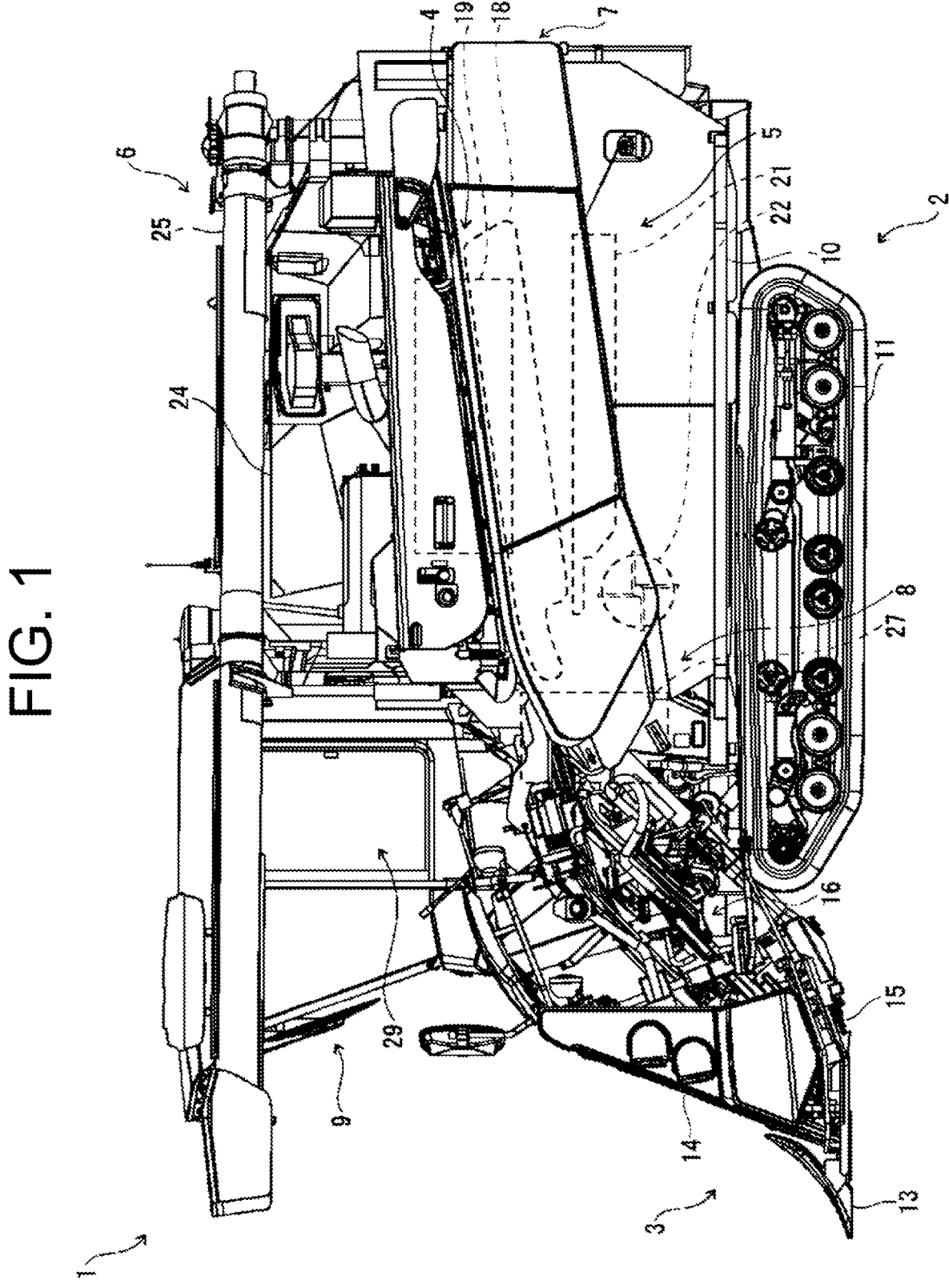
FIG. 1 is a side view of a combine harvester according to an exemplary embodiment of the present invention.

As illustrated in FIG. 1, the combine harvester 1 includes a traveling part 2, a reaping part 3, a threshing part 4, a sorting part 5, a reservoir 6, a discharged straw processing part 7, a power output part 8, and a steering part 9, and is configured as a so-called head-feeding combine harvester. While travelling by the traveling part 2, the combine harvester 1 threshes, by the threshing part 4, grain culms reaped by the reaping part 3, sorts the grains with the sorting part 5, and stores the grains in the reservoir 6. The combine harvester 1 processes waste straw after the threshing by the discharged straw processing part 7. The combine harvester 1 drives the traveling part 2, the reaping part 3, the threshing part 4, the sorting part 5, the reservoir 6, and the discharged straw processing part 7 with power supplied by the power output part 8.

The traveling part 2 is provided below a machine body frame 10, and includes a left-and-right pair of crawler type traveling devices 11, and a transmission (not illustrated). The traveling part 2 causes the combine harvester 1 to travel in the front-rear direction, or causes the combine harvester 1 to turn in the left-right direction by rotating crawlers of the crawler type traveling devices 11 with power (for example, rotational power) transmitted from an engine 27 of the power output part 8. The transmission transmits the power (rotational power) of the power output part 8 to the crawler type traveling devices 11, and is capable of shifting the rotational power.

The reaping part 3 is provided in front of the traveling part 2, and performs reaping work on rows within the maximum number of reaping rows included in a predetermined reaping width. The reaping part 3 includes a divider 13, a raising device 14, a cutting device 15, and a conveying device 16. The divider 13 divides grain culms in the field for every row and guides a predetermined number of grain culms for the rows within the maximum number of reaping rows to the raising device 14. The raising device 14 raises the grain culms guided by the divider 13. The cutting device 15 cuts the grain culms raised by the raising device 14. The conveying device 16 conveys the grain culms cut by the cutting device 15 to the threshing part 4.

The threshing part 4 is provided behind the reaping part 3. The threshing part 4 includes a feed chain 18, and a threshing cylinder 19. The feed chain 18 conveys, for threshing, the grain culms conveyed from the conveying device 16 of the reaping part 3, and further conveys the grain culms after threshing, that is, discharged straw to the discharged straw processing part 7. The threshing cylinder 19 threshes the grain culms conveyed by the feed chain 18.

The sorting part 5 is provided below the threshing part 4. The sorting part 5 includes a swing sorting device 21, a wind sorting device 22, a grain conveying device (not illustrated), and a straw waste discharging device (not illustrated). The swing sorting device 21 sifts the threshed grains that falls from the threshing part 4 and sorts the threshed grains into grain, straw waste, etc. The wind sorting device 22 further sorts the threshed grains sorted by the swing sorting device 21 into grain, straw waste, etc., by air blow. The grain conveying device conveys the grains sorted by the swing sorting device 21 and the wind sorting device 22 to the reservoir 6. The straw waste discharging device discharges the straw waste and the like sorted by the swing sorting device 21 and the wind sorting device 22 to the outside of the combine harvester.

The reservoir 6 is provided on the right side of the threshing part 4. The reservoir 6 includes a grain tank 24 and a discharging device 25. The grain tank 24 stores the grains conveyed from the sorting part 5. The discharging device 25 is composed of an auger or the like, and discharges the grains stored in the grain tank 24 to a freely selected place.

The discharged straw processing part 7 is provided behind the threshing part 4. The discharged straw processing part 7 includes a discharged straw conveying device (not illustrated), and a discharged straw cutting device (not illustrated). The discharged straw conveying device conveys the discharged straw conveyed from the feed chain 18 of the threshing part 4 to the discharged straw cutting device. The discharged straw cutting device cuts the discharged straw conveyed by the discharged straw conveying device, and discharges the cut discharged straw to the outside of the combine harvester, for example, discharged right rearward of the combine harvester 1.

The power output part 8 is provided above the traveling part 2 and in front of the reservoir 6. The power output part 8 includes the engine 27 that generates rotational power. The power output part 8 transmits the rotational power generated by the engine 27 to the traveling part 2, the reaping part 3, the threshing part 4, the sorting part 5, the reservoir 6, and the discharged straw processing part 7.

The steering part 9 is provided above the power output part 8. The steering part 9 includes a driver's seat 29 and a plurality of operation tools (not illustrated). The driver's seat 29 is a seat on which an operator sits, and is provided on the right side, for example. The operation tools includes a steering wheel for changing the travelling direction of the combine harvester 1, i.e., steering the combine harvester 1, and the operator is able to control the travel and work of the combine harvester 1 by operating the operation tool such as a steering wheel. The operation tools also include an accelerator to adjust the speed of the engine 27, i.e., the traveling speed of the traveling part 2 of the combine harvester 1, and an up-and-down switch for lifting and lowering the reaping part 3.

The combine harvester 1 includes an onboard camera 32 (see FIG. 3) that captures images around the combine harvester 1. The onboard camera 32 photographs the work target field and obtains field images.

Figure 2:
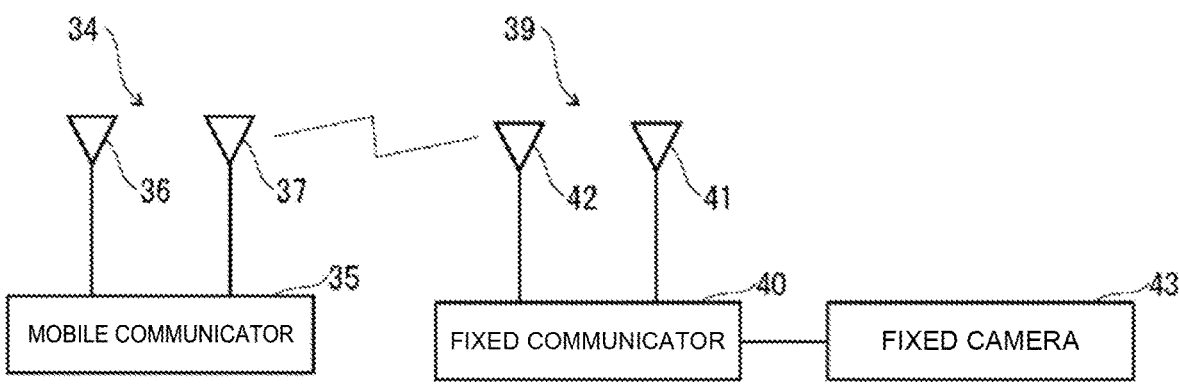
FIG. 2 is a block diagram of a mobile station and a base station, for the combine harvester according to the exemplary embodiment of the present invention.

As illustrated in FIG. 2, the combine harvester 1 includes a mobile station 34 which uses a satellite positioning system such as GPS or the like to obtain position information on the combine harvester 1. The mobile station 34 includes, for example, a mobile communicator 35, a mobile GPS antenna 36, and a data receiving antenna 37. The mobile communicator 35 communicates with GPS satellites via the mobile GPS antenna 36 to obtain the position information on the mobile station 34, i.e., the position information on the combine harvester 1.

The base station 39 may be installed in a levee around a work target field for the combine harvester 1 as illustrated in FIG. 2. According to the present exemplary embodiment, an example is described in which the base station 39 is used for correcting position information of the combine harvester 1, the base station 39 may not be provided, and correction of the position information using the base station 39 may not be performed.

The base station 39 includes a fixed communicator 40, a mobile GPS antenna 41, and a data transmitting antenna 42. The fixed communicator 40 communicates with GPS satellites via the fixed GPS antenna 41 to obtain the position information on the base station 39. The fixed communicator 40 transmits correction information based on the position information of the base station 39 to the mobile communicator 35 via the data transmitting antenna 42.

The base station 39 may also include a fixed camera 43 for photographing a field. The fixed camera 43 photographs the work target field and obtains field images. The fixed communicator 40 obtains the images captured by the fixed camera 43, and transmits it to the mobile communicator 35 via the data transmitting antenna 42. According to the present exemplary embodiment, an example is described in which the fixed camera 43 of the base station 39 is used for obtaining field information, the fixed camera 43 may not be provided, and obtaining the field information using the fixed camera 43 may not be performed.

The mobile communicator 35 of the mobile station 34 communicates wirelessly with the fixed communicator 40 of the base station 39 via the data receiving antenna 37. The mobile communicator 35 receives the correction information from the fixed communicator 40, and corrects the position information of the mobile station 34, that is, the position information of the combine harvester 1, based on the correction information. From the fixed communicator 40, the mobile communicator 35 receives the field images captured by the fixed camera 43.

Figure 3:
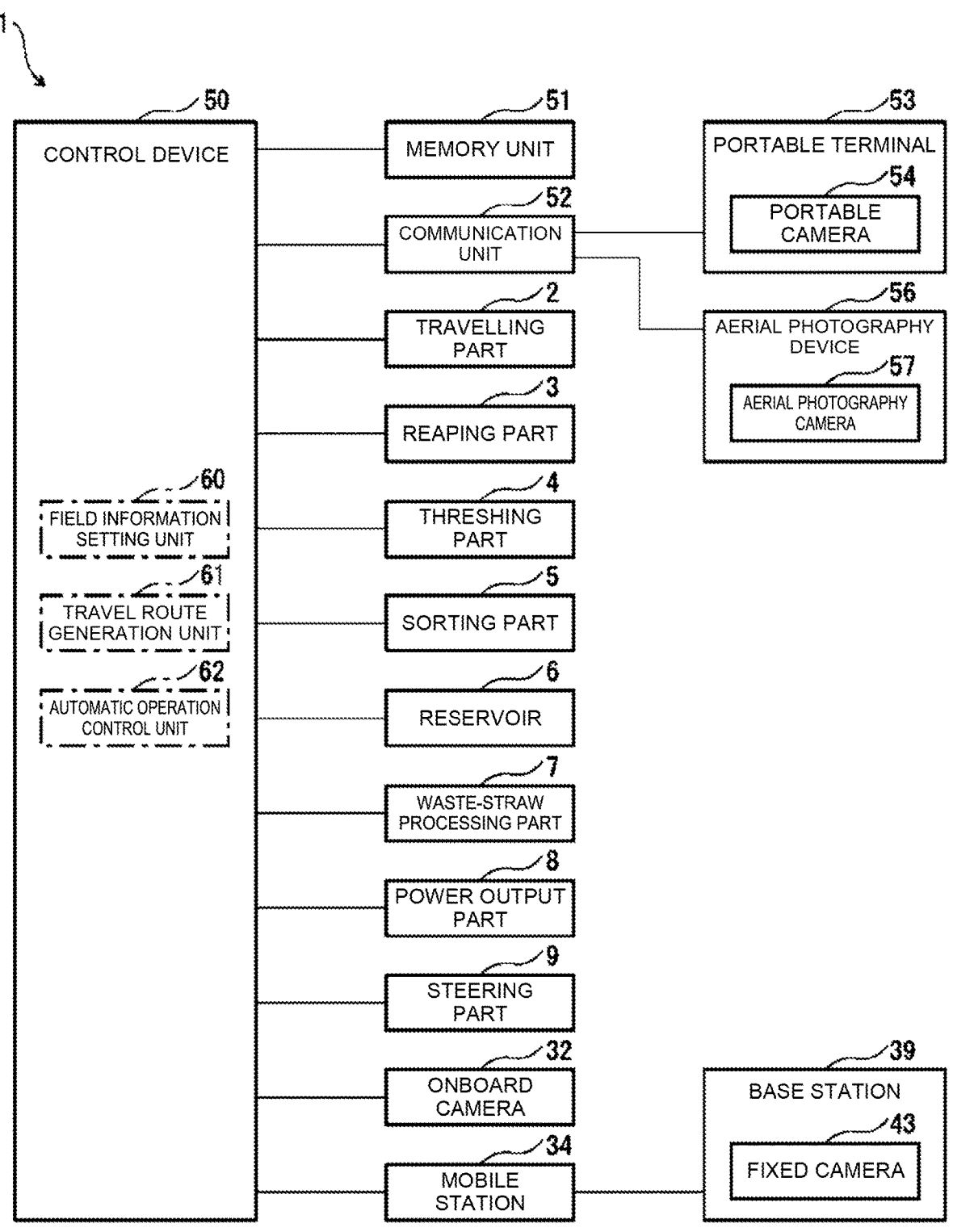
FIG. 3 is a block diagram of the combine harvester according to the exemplary embodiment of the present invention.

Next, a control device 50 of the combine harvester 1 will be described with reference to FIG. 3.

The control device 50 is composed of a computer such as a CPU, and is connected to a memory unit 51 such as a ROM, a RAM, a hard disk drive, and a flash memory. The memory unit 51 stores programs and data for controlling various components and various functions of the combine harvester 1, and the control device 50 performs arithmetic operations based on the programs and data stored in the memory unit 51, thereby controlling the various components and functions of the combine harvester 1. For example, the control device 50 controls the mobile station 34 to obtain the position information on the combine harvester 1 from the mobile communicator 35.

The combine harvester 1 includes a communication unit 52, and the control device 50 communicates wirelessly with an external device such as a portable terminal 53 owned by the operator via the communication unit 52 to send and receive various information to and from the portable terminal 53. The portable terminal 53 is a terminal capable of remotely operating the combine harvester 1, and is composed of, for example, a tablet terminal with a touch panel, a notebook personal computer, or the like. An operation tool similar to that of the portable terminal 53 may be provided in the steering part 9. The portable terminal 53 may include a portable camera 54 for capturing images. The portable camera 54, for example, photographs the work target field and obtains field images. According to the present exemplary embodiment, an example is described in which the portable camera 54 is used for obtaining field information, the portable camera 54 may not be provided, and obtaining the field information using the portable camera 54 may not be performed.

The portable terminal 53 is configured to receive input operations, such as touch operation to a touch panel, associated with the field information pertaining to the work target field. The portable terminal 53 displays a field information setting screen which allows to set a shape of a field edge that constitute a field periphery (hereinafter referred to as the field shape), position information (coordinates, etc.) on the field edge, a shape of an unreaped area in the field, position information (coordinates, etc.) of an area having unreaped grain culms (hereinafter referred to as the unreaped area), a row direction of a plurality of rows in the field or the unreaped area, a row arranging direction crossing the row direction (width direction), the total row number of the plurality of rows, etc. as field information. While displaying the field map based on a field information, the portable terminal 53 may display the travel route of the combine harvester 1 on the field map so that its traveling direction can be seen.

The control device 50 may communicate wirelessly with an aerial photography device 56, such as a drone with an aerial photography camera 57, via the communication unit 52, and the aerial photography device 56 may communicate wirelessly with the portable terminal 53. According to the present exemplary embodiment, an example is described in which the aerial photography device 56 and the aerial photography camera 57 are used for obtaining field information, the aerial photography device 56 and the aerial photography camera 57 may not be provided, and obtaining the field information using the aerial photography camera 57 may not be performed. The control device 50 or the portable terminal 53 receives the operator's instructions to operate the aerial photography device 56 or to photograph the field, and transmits the instructions to the aerial photography device 56. The aerial photography device 56 operates according to the operation instructions and controls the aerial photography camera 57 according to the photography instructions, thereby photographing the field to obtain field images. The aerial photography device 56 transmits the field images captured by the aerial photography camera 57 to the control device 50 or the portable terminal 53.

The control device 50 receives the field images captured by the onboard camera 32, the fixed camera 43, the portable camera 54 or the aerial photography camera 57, and causes the monitor of the steering part 9 to display the field images. Alternatively, the control device 50 may transmit the captured field images to the portable terminal 53 and causes the monitor of the portable terminal 53 to display the captured field images.

Furthermore, the combine harvester 1 presets the maximum number of reaping rows, which is a reaping capacity value of the reaping part 3, to six rows, and stores it in the memory unit 51. If the combine harvester 1 performs the reaping work on a few number of rows, such as one or two rows, less than the maximum number of reaping rows, there is a possibility of defective conditions such as reduced threshing accuracy, entrapment of discharged straw, etc., may occur due to reduction of a reaped amount and travelling in a reaped area. However, even for a case less than the maximum number of reaping rows, if the reaping work is performed with the number of reaping rows, such as four or five rows, reduction in reaped amount is small and the travelling width of the reaped area is narrow, so that such defective conditions are suppressed. Therefore, according to the present exemplary embodiment, the number of rows which suppress such defective conditions caused by the reaping work with a small number of reaping rows is referred to as the lower limit number of reaping rows, and the combine harvester 1 presets the lower limit number of reaping rows, which is less than the maximum number of reaping rows, to five rows, and stores it in the memory unit 51. Here, the lower limit number of reaping rows may be freely set in response to an input operation through the portable terminal 53 by the operator, and is not limited to five, which is one less than the maximum number of reaping rows, but may be set to four, which is two less than the maximum number of reaping rows.

Furthermore, the combine harvester 1 may presets a reaping width for each row, which is a reaping capacity value of the reaping part 3, and a reaping width of the rows of the maximum number of reaping rows, and store them in the memory unit 51. The reaping width of the rows of the maximum number of reaping rows may be determined based on the reaping width for each path.

In addition, by executing a program stored in the memory unit 51, the control device 50 operates as a field information setting unit 60, a travel route generation unit 61, and an automatic operation control unit 62. The travel route generation unit 61 implements the travel route generation method of the present invention.

The field information setting unit 60 sets automatically or manually the field information about the work target field, and stores the field information in the memory unit 51. For example, the field information setting unit 60 manually sets the field information in response to the input operation of the farm field information to a farm field information setting screen of the portable terminal 53. Alternatively, the field information setting unit 60 automatically obtains the field images captured by the onboard camera 32 of the combine harvester 1, the fixed camera 43 of the base station 39, the portable camera 54 of the portable terminal 53, or the aerial photography camera 57 of the aerial photography device 56, and performs image analysis is performed to the field images, thereby automatically obtaining the field information. The field information setting unit 60 may analyze the field information from the field images of one camera or two or more cameras among the onboard camera 32, the fixed camera 43, the portable camera 54, and the aerial photography camera 57.

Furthermore, the field information setting unit 60 is able to obtain more accurate field information by matching the field information that is set manually through the portable terminal 53 with the field information that is set automatically based on the field images from the onboard camera 32, the fixed camera 43, the portable camera 54, or the aerial photography camera 57.

The travel route generation unit 61 generates a travel route which is referenced by the combine harvester 1 for performing the autonomous travel and the autonomous reaping in the field by the automatic operation, and stores the generated travel route in the memory unit 51. The travel route includes not only travel setting associated with traveling, but also work setting associated with some work such as reaping. In addition to the traveling position in the field, the travel setting also includes a traveling speed and a traveling direction (steering direction and forward or backward). The work setting includes information about whether during operation or stop of reaping at each travel position, the reaping speed and reaping height, the number of reaping rows, and any other work.

The travel route generation unit 61 regards the unreaped area in the field as a work area, sets a work path for reaping while traveling to be straight, and sets a travel route for the work area by combining a plurality of such straight paths. According to the present exemplary embodiment, the travel route generation unit 61 generates a travel route for forward and backward reaping by travelling back and forth on the plurality of straight paths in the work area along the row direction and reaping on rows of a predetermined number in each path are performed. In the reaping work where an unreaped area and an area after reaping grain culms (hereinafter referred to as the reaped area) exist in the work area, the travel route generation unit 61 combines paths for the forward and backward reaping so that the unreaped area is located to the right of the combine harvester 1 while the unreaped area is located to the left of the combine harvester 1, as far as possible.

Specifically, the travel route generation unit 61 generates a travel route so that back and forth travelling is performed in a manner travelling on a path on one end side in one direction in the row arranging direction crossing the row direction, then traveling on the headland to move to the other end side, and then travelling on a path on the other end side in the other direction (i.e., direction opposite the one direction). The travel route generation unit 61 also generates a travel route for performing such back and forth travelling while shifting the path from both end side as viewed in the arranging direction to the central side. As a result, a start path of the travel route is set at one end side as viewed in the arranging direction of the work area, and a last path is set at the central side.

As an empty travel route running through the headland for travelling between two paths, the travel route generation unit 61 may set any one of various turning methods including a U-shaped turn that is a basic turning method in which a 180-degree-turn is conducted only by moving forward, and a fishtail turn in which the combine harvester returns after turning 90 degrees while moving forward, and then, turns another 90 degrees while moving forward. The travel route generation unit 61 may automatically select some turning method based on the distance between the two paths. For example, it may select the U-turn if they are relatively far apart, while it may select the fishtail turn if they are relatively close and therefore cannot make the U-turn. The travel route generation unit 61 may also automatically select a turning method based on the topography and road surface conditions (such as muddy) of the headland. Alternatively, the travel route generation unit 61 may manually select such turning method in response to input operations using the portable terminal 53.

It is preferable that the travel route generation unit 61 sets the maximum number of reaping rows for (i.e., assigns rows of the maximum number of reaping rows to) each path as much as possible. The travel route generation unit 61 sets the minimum number or more of reaping rows for each path based on the total number of rows in the work area based on the total number of the rows in the work area, which is the field information, and the maximum number and lower limit number of reaping rows, which are the reaping capacity values of the reaping part 3, and then generates a travel route. The travel route generation unit 61 sets the maximum number of reaping rows for a path having reaped rows only. At this time, regardless of whether the left or right side of the body of the combine harvester 1 is a reaped area or an unreaped area, the travel route generation unit 61 may set a path of the maximum number of reaping rows to the travel route.

The travel route generation unit 61 also sets the lower limit number of reaping rows to a path having both a reaped row and an unreaped row. At this time, the travel route generation unit 61 sets a path having the lower limit number of reaping rows to the travel route so that the reaped rows are located on the front right-side of the body of the combine harvester 1 and the unreaped rows are located on the front left-side of the body of the combine harvester 1, that is, so that the reaped area is located on the right of body of the combine harvester 1.

When setting a plurality of paths, as a first setting operation, the travel route generation unit 61 first divides the total number of rows in the work area by the maximum number of reaping rows. This division is hereafter referred to as the first division. As a result of this first division, If there is no remainder, that is, if the total number of rows is a multiple of the maximum number of reaping rows, the travel route generation unit 61 determines a plurality of paths in the work area by setting the quotient as the number of paths, and sets the maximum number of reaping rows to each path. Furthermore, the travel route generation unit 61 then generates a travel route so that the reaping work of the maximum number of reaping rows is performed in each of the paths of this number of paths.

On the other hand, If the result of the first division shows that there is a remainder, as a second setting operation, the travel route generation unit 61 tentatively sets a plurality of paths in the work area by setting a value obtained by adding one to the quotient as the number of paths, and tentatively sets the maximum number of reaping rows to each of the paths other than the last path. Furthermore, the travel route generation unit 61 regards the last path in the work area as an adjustment path, tentatively sets the lower limit number of reaping rows thereto, and divides the number of remaining rows in the paths other than those in the last path by the maximum number of reaping rows. This division is hereafter referred to as the second division.

If the result of this second division shows that the remainder (the number of excess rows) is within the difference between the maximum number of reaping rows and the lower limit number of reaping rows, the travel route generation unit 61 sets the number of addition result rows obtained by adding the lower limit number of reaping rows and the number of excess rows to the last path while setting the maximum number of reaping rows to each remaining path other than the last path. Then, the travel route generation unit 61 generates a travel route so that reaping work with the maximum number of reaping rows is performed from the start path to the first previous path from the last path, and reaping work with the number of addition result rows is performed in the last path.

Furthermore, if the result of the second division shows that the remainder (the number of excess rows) exceeds the difference between the maximum number of reaping rows and the lower limit number of reaping rows, as a third setting operation, the travel route generation unit 61 tentatively sets the lower limit number of reaping rows to the adjustment paths that includes the last path and a further path and divides the number of remaining rows other than those in the adjustment path, by the maximum number of reaping rows, that is, the second division is performed again.

If the result of this follow-up second division shows that the remainder (the number of excess rows) is within the difference between the maximum number of reaping rows and the lower limit number of reaping rows, the travel route generation unit 61 sets a number of addition result rows obtained by adding the lower limit number of reaping rows and the number of excess rows, or the lower limit number of reaping rows, to the respective adjustment paths while setting the maximum number of reaping rows to the respective remaining paths other than the adjustment paths. Then, the travel route generation unit 61 generates a travel route so that reaping work with the maximum number of reaping rows is performed on the paths other than the adjustment paths that include the last path and the further path, and so that reaping work with the lower limit number of reaping rows or the number of addition result rows is performed on the adjustment paths that include the last path and the further path.

If the result of the follow-up second division shows that the remainder (the number of excess rows) exceeds the difference between the maximum number of reaping rows and the lower limit number of reaping rows, the travel route generation unit 61 further performs the third setting operation. In other words, the travel route generation unit 61 repeats the third setting operation until the number of excess rows is within the difference between the maximum number of reaping rows and the lower limit number of reaping rows.

When adding a further path to the adjustment paths in the third setting operation, the travel route generation unit 61 preferably adds thereto a predetermined number of path(s) selected back from the last path. For example, in the first time third setting operation, the travel route generation unit 61 sets the adjustment paths that include the first previous path from the last path in addition to the last path. In the second time third setting operation, the travel route generation unit 61 re-sets the adjustment paths so as to further include the second previous path from the last path in addition to the first adjustment paths (i.e., the last path and the first previous path from the last path). In this way, each time the third setting operation is performed, the travel route generation unit 61 adds the path to the adjustment paths successively one by one in a going-back manner from the first previous path from the last path.

Furthermore, when the unreaped area of the field is split by predetermined times of middle-splitting along the row direction, the travel route generation unit 61 respectively sets a plurality of paths to the plurality of split areas obtained by the respective middle-splitting. The travel route generation unit 61 also connects the paths between the split areas by setting an empty travel route running through the headland for travelling between the last path of one split area and the start path of the next split area. In this way, the travel route generation unit 61 generates a travel route for the plurality of split areas.

In each split area, a path along the middle-splitting may have an unreaped area on the right side of the body of the combine harvester 1, and the travel route generation unit 61 sets the maximum number of reaping rows to such a middle-split path. In a state of setting the maximum number of reaping rows to the middle-split path in each split area, the travel route generation unit 61 regards each split area as a work area, and sets a plurality of paths for each split area by performing the first setting operation, the second setting operation, and the third setting operation described above.

For example, in the second setting operation, the travel route generation unit 61 divides the number of remaining rows, which is obtained when the maximum number of reaping rows is set to the middle-split path in the split area and the lower limit number of reaping rows is set to the last path, by the maximum number of reaping rows (second division).

Furthermore, in the third setting operation, the travel route generation unit 61 divides the number of remaining rows, which is obtained when the maximum number of reaping rows is set to the middle-split path in the split area and the lower limit number of reaping rows is set to an adjustment paths that include the last path and a further path, by the maximum number of reaping rows (follow-up second division).

As described above, it is preferable to set the paths so that the reaped area is located on the right side of the body of the combine harvester 1 as much as possible. Therefore, the travel route generation unit 61 sets the start path of the next split area so that one split area, which is the reaped area, is located on the right side of the body of the combine harvester 1. Furthermore, for the plurality of split areas, it is desirable to make the empty travel route between the last path of one split area and the start path of the next split area as short as possible. Therefore, the travel route generation unit 61 sets the direction of travel between the last path of one split area and the start path of the next split area in opposite directions, and also sets the start path of the next split area on the side of the first split area. From such reasons, the travel route generation unit 61 generate a travel route by setting an even number of paths to each of the split areas.

Based on the travel setting and work setting for the travel route generated by the travel route generation unit 61, an automatic operation control unit 62 controls the power output part 8 as well as the traveling part 2 and the reaping part 3 to execute automatic traveling and automatic reaping according to the travel route. The automatic operation control unit 62 allows the reaping part 3 to automatically reap unreaped grain culms on the travel route. In response to the autonomous reaping, the automatic operation control unit 62 controls the threshing part 4, the sorting part 5, the reservoir 6, and the discharged straw processing part 7 to automatically perform threshing grain culms after reaping, sorting the grains and straw waste after threshing, storing the grains after sorting, and processing the straw discharged after threshing, respectively. The combine harvester 1 includes a gyro sensor and an orientation sensor to obtain displacement information and orientation information of the combine harvester 1, and the automatic operation control unit 62 may adjust autonomous travel of the combine harvester 1 based on the displacement information and the orientation information.

Figure 4:
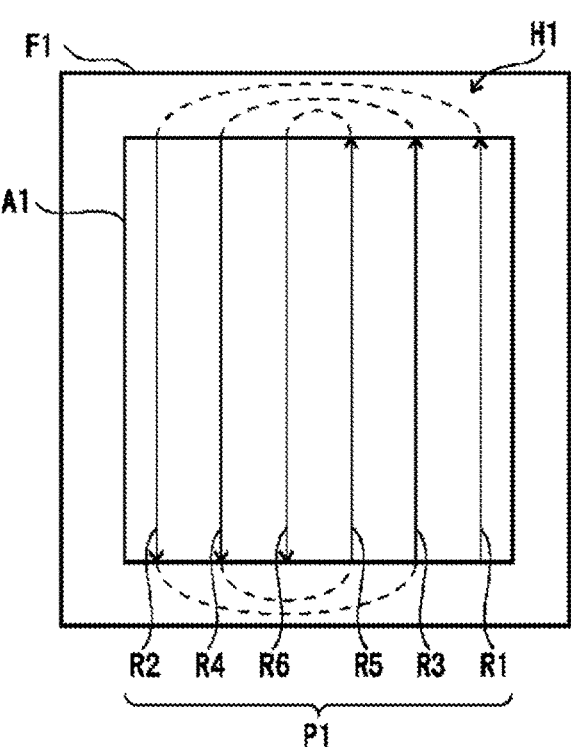
FIG. 4 is a plan view illustrating a field of a first example of the combine harvester according to the exemplary embodiment of the present invention, together with a travel route.

Next, a first example of generating a travel route for forward and backward reaping travel by the combine harvester 1 will be described. In the first example, a work target is a field F1 formed in a rectangular shape as illustrated in FIG. 4 and cropping rice, wheat, etc. The vertical direction of the drawing sheet of FIG. 4 is the row direction of the grain culms in the field F1, while the horizontal direction of the drawing sheet is the arranging direction (width direction) of the rows.

In the first example, the field F1 has a headland H1 that extends around the unreaped area A1 and serves as a turning space for forward and backward reaping travel. The headland H1 is generated by manually operating the combine harvester 1 to travel and reap on an unreaped area extending along the periphery of the field F1. The headland H1 may be generated by headland straight travel (automatic straight travel) along a straight line of the edge of the field and manual turn. For example, the operator controls the power output part 8 as well as the traveling part 2 and the reaping part 3 of the combine harvester 1, by manual operation, to travel and reap inside the field F1 in a circular motion along the field edge and to generate the headland H1 along the field edge. Alternatively, the headland H1 may be prepared in advance in the field F1.

First, for performing autonomous reaping travel on the unreaped area A1 in the field F1 as a work area, the field information setting unit 60 automatically or manually sets the field information such as a field shape, position information on the field edge, a shape of the unreaped area A1, position information on the unreaped area A1, a row direction of the plurality of rows in the unreaped area A1, a row arranging direction crossing the row direction, the total number of rows of the plurality of rows, etc.

Next, based on the field information set by the field information setting unit 60, the travel route generation unit 61 generates a travel route P1 for autonomous traveling and autonomous reaping in the unreaped area A1 by forward and backward reaping travel as illustrated in FIG. 4 and stores it in the memory unit 51. FIG. 4 illustrates an example of travel route P1 in which six straight path R1 to R6 are set to the unreaped area A1 that includes 31 to 36 rows in total, where the path R1 is the start path and the path R6 is the last path.

Figure 5:
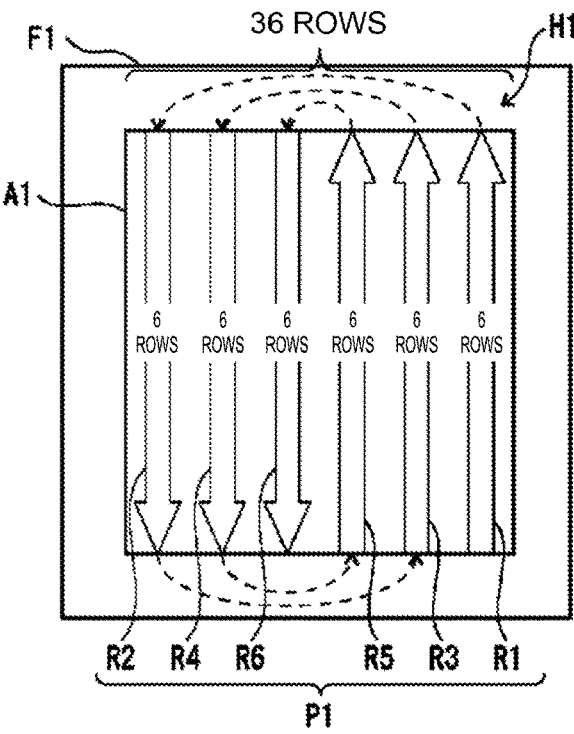
FIG. 5 is a plan view illustrating a field associated with the first operation example of the combine harvester according to the exemplary embodiment of the present invention, together with a travel route.

In terms of this first example, a first operation example when the total number of rows in the unreaped area A1 is a multiple of the maximum number of reaping rows, for example, when the total number of rows is 36 rows while the maximum number of reaping rows is 6 rows will be described with reference to FIG. 5.

In this first operation example, as the first setting operation, the travel route generation unit 61 first divides the total number of rows in the work area (36 rows) by the maximum number of reaping rows (6 rows) (first division). The result of this first division shows that the quotient is 6 and the remainder is 0. The travel route generation unit 61 determines a plurality of paths by setting the number of paths to 6, and generates a travel route P1 to travel back and forth over the 6 paths R1 to R6 (see FIG. 4). The travel route generation unit 61 then sets the maximum number of reaping rows (6 rows) to each path R1 to R6, as illustrated in FIG. 5.

Figure 6:
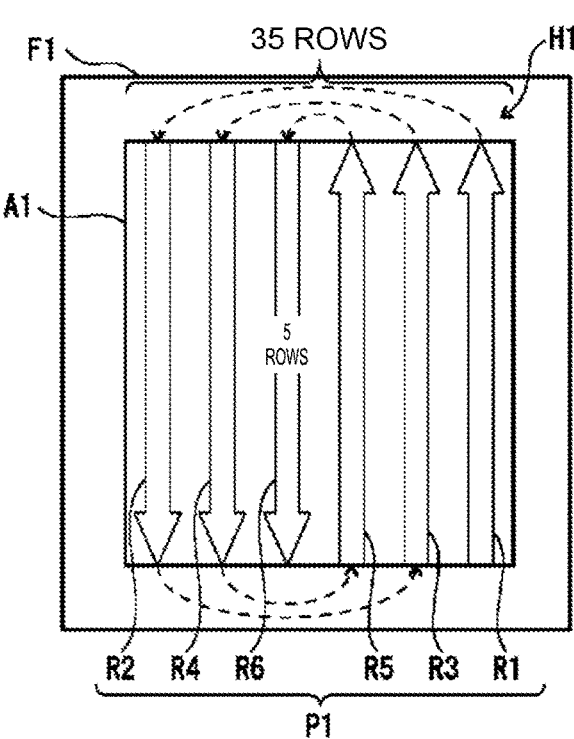
FIG. 6 is a plan view illustrating a field associated with a second operation example of the combine harvester according to the exemplary embodiment of the present invention, together with a travel route when tentatively setting the lower limit number of reaping rows.
Figure 7:
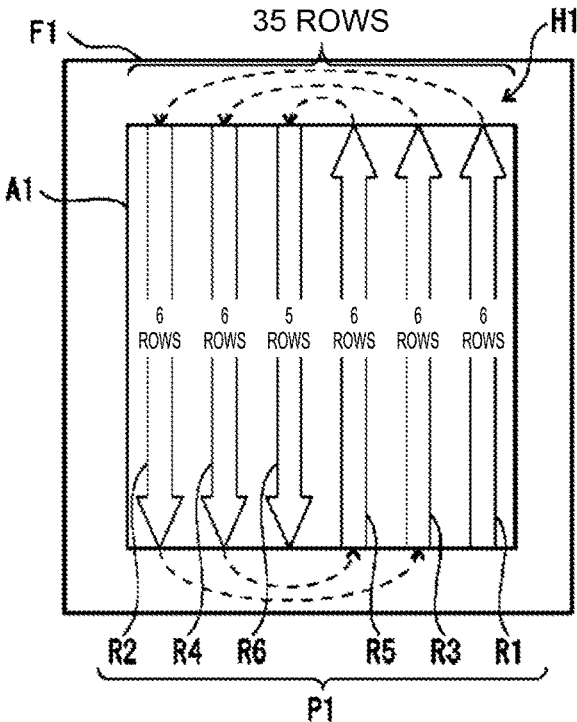
FIG. 7 is a plan view illustrating the field associated with the second operation example of the combine harvester according to the exemplary embodiment of the present invention, together with the travel route.

Furthermore, in terms of the first example, a second operation example when the total number of rows in the unreaped area A1 is not a multiple of the maximum number of reaping rows, for example, when the total number of rows is 35 rows while the maximum number of reaping rows is 6 rows will be described with reference to FIGS. 6 and 7.

In this second operation example, as the first setting operation, the travel route generation unit 61 first divides the total number of rows in the work area (35 rows) by the maximum number of reaping rows (6 rows) (first division). The result of this first division shows that the quotient is and the remainder is 5. As the second setting operation, the travel route generation unit 61 determines a plurality of paths by setting the number of paths to 6 by adding 1 to the remainder '5', and generates a travel route P1 so as to travel back and forth over the 6 paths R1 to R6 (see FIG. 4). Then, the travel route generation unit 61 tentatively sets the lower limit number of reaping rows (5 rows) to the last path R6, as illustrated in FIG. 6.

Furthermore, the travel route generation unit 61 divides the number of remaining rows (30 rows) other than those in the last path R6 to which the lower limit number of reaping rows (5 rows) is set, by the maximum number of reaping rows (6 rows) (second division). Since the result of this second division shows that the remainder (the number of excess rows) is 0 that is within the difference (1 row) between the maximum number of reaping rows (5 rows) and the lower limit number of reaping rows (5 rows), the travel route generation unit 61 sets, as illustrated in FIG. 7, the number of addition result rows (5 rows) obtained by adding the lower limit number of reaping rows (5 rows) and the number of excess rows (0 rows) to the last path R6, while setting the maximum number of reaping rows (6 rows) to each remaining path R1 to R5 other than the last path R6.

Figure 8:
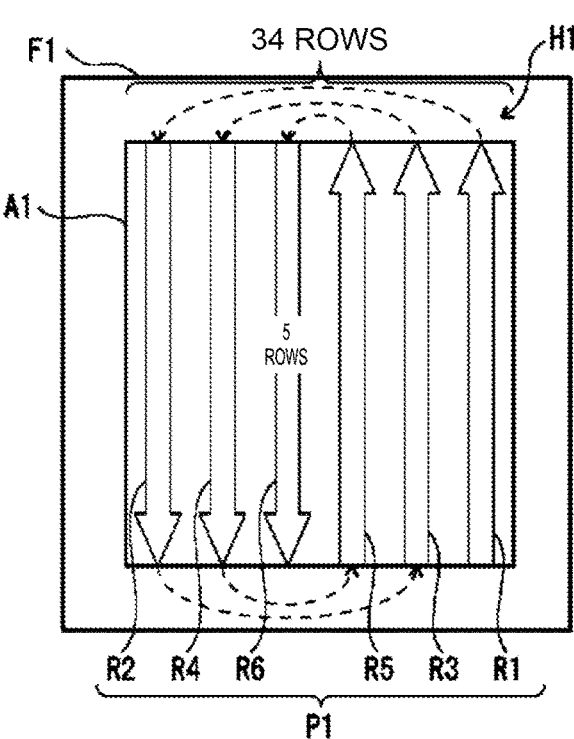
FIG. 8 is a plan view illustrating a field associated with a third operation example of the combine harvester according to the exemplary embodiment of the present invention, together with a travel route when tentatively setting the lower limit number of reaping rows.
Figure 9:
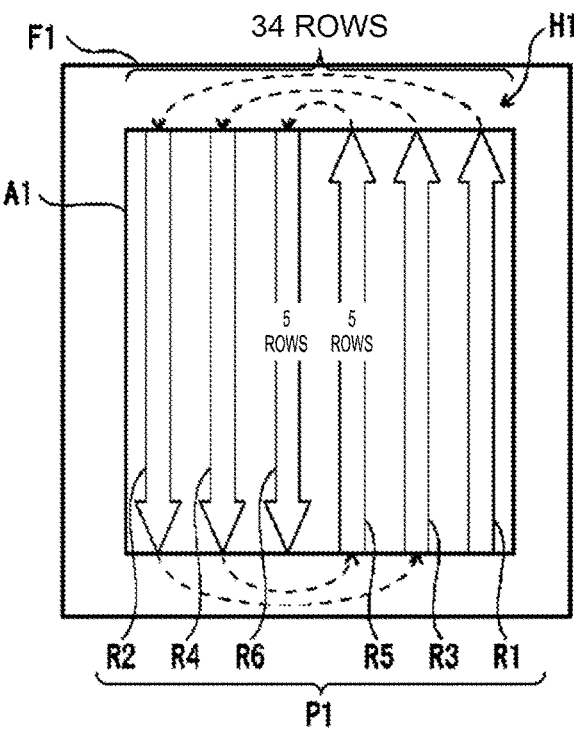
FIG. 9 is a plan view illustrating the field associated with the third operation example of the combine harvester according to the exemplary embodiment of the present invention, together with the travel route when tentatively setting the lower limit number of reaping rows.

Furthermore, in terms of the first example, a third operation example when the total number of rows is 34 rows while the maximum number of reaping rows is 6 rows will be described with reference to FIGS. 8 through 10.

In this third operation example, as the first setting operation, the travel route generation unit 61 first divides the total number of rows in the work area (34 rows) by the maximum number of reaping rows (6 rows) (first division). The result of this first division shows that the quotient is and the remainder is 4. As the second setting operation, the travel route generation unit 61 determines a plurality of paths by setting the number of paths to 6 by adding 1 to the remainder '5', and generates a travel route P1 so as to travel back and forth over the 6 paths R1 to R6 (see FIG. 4). Then, the travel route generation unit 61 tentatively sets the lower limit number of reaping rows (5 rows) to the last path R6, as illustrated in FIG. 8.

Furthermore, the travel route generation unit 61 divides the number of remaining rows (29 rows) of rows other than those in the last path R6 to which the lower limit number of reaping rows (5 rows) is set, by the maximum number of reaping rows (6 rows) (second division). Since the result of the second division shows that the remainder (the number of excess rows) is 5 that is not within the difference (1 row) between the maximum number of reaping rows (6 rows) and the lower limit number of reaping rows (5 rows), as the third setting operation, the travel route generation unit 61 tentatively sets, as illustrated in FIG. 9, the lower limit number of reaping rows (5 rows) to the adjustment paths that include the last path R6 and the first previous path R5 therefrom, and divides the number of remaining rows (24 rows) other than those in the adjustment paths, by the maximum number of reaping rows (6 rows) (follow-up second division).

Figure 10:
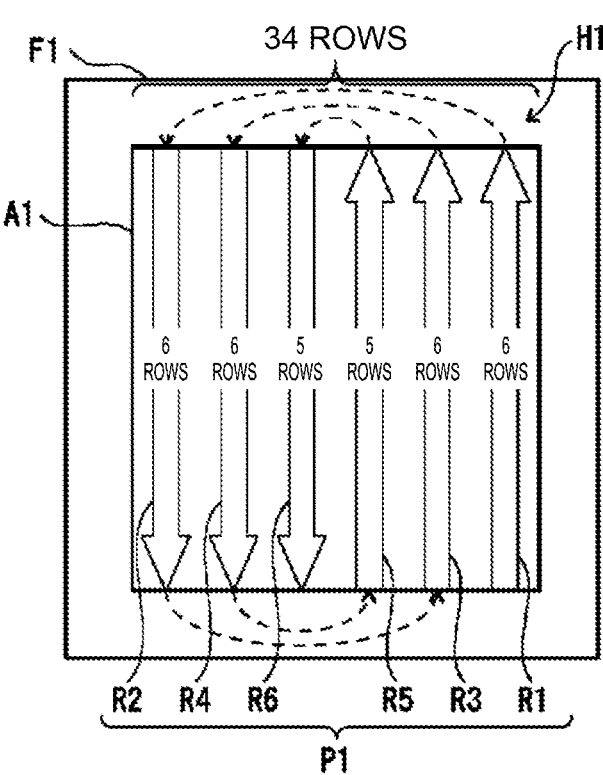
FIG. 10 is a plan view illustrating the field associated with the third operation example of the combine harvester according to the exemplary embodiment of the present invention, together with the travel route.

Since the result of this follow-up second division shows that the remainder (the number of excess rows) is 0 that is within the difference (1 row) between the maximum number of reaping rows (5 rows) and the lower limit number of reaping rows (5 rows), the travel route generation unit 61 sets, as illustrated in FIG. 10, the number of addition result rows (5 rows) obtained by adding the lower limit number of reaping rows (5 rows) and the number of excess rows (0 rows) to the last path R6 (or the first previous path R5 therefrom) of the adjustment paths, sets the lower limit number of reaping rows (5 rows) to the first previous path R5 in the adjustment paths (or the last path R6), and sets the maximum number of reaping rows (6 rows) to each remaining path R1 to R4 other than the adjustment paths.

If the total number of rows in the work area is 33 to 31, the third setting operation is repeated in the third operation example described above.

Figure 11:
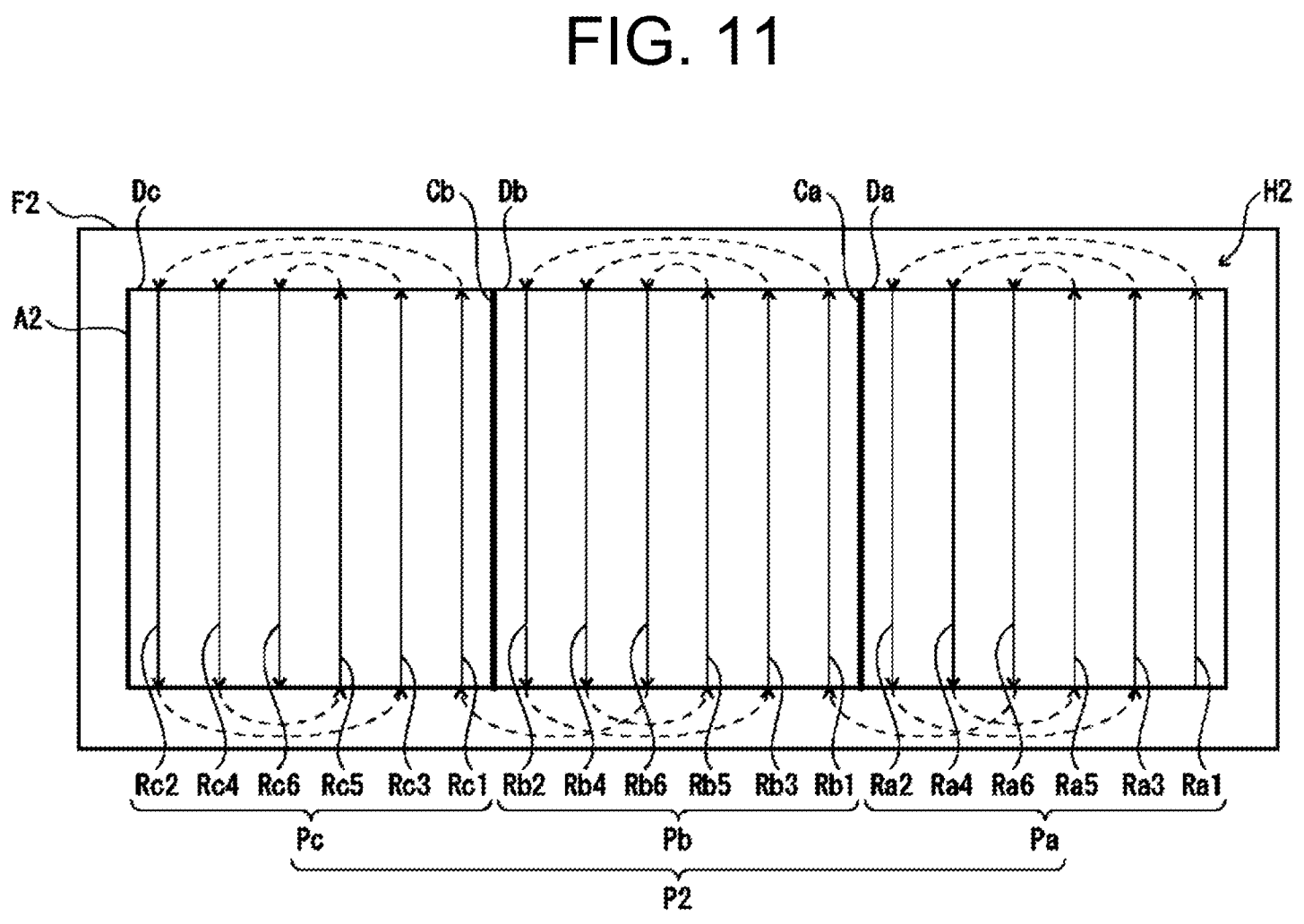

Next, a second example of generating a travel route for forward and backward reaping travel by the combine harvester 1 will be described. In the second example, a work target is a field F2 formed in a rectangular shape as illustrated in FIG. 11 and cropping rice, wheat, etc. The vertical direction of the drawing sheet of FIG. 11 is the row direction of the grain culms in the field F2, while the horizontal direction of the drawing sheet is the arranging direction (width direction) of the rows.

In the second example, the field F2 has a headland H2 that extends around the unreaped area A2 and serves as a turning space for forward and backward reaping travel. The headland H2 is generated in the same way as the headland H1 in the first example. The field F2 and the unreaped area A2 are long in the row arranging direction, and the unreaped area A2 is split into split areas Da, Db, and Dc by a predetermined times (for example, twice) of middle-splitting Ca and Cb.

First, for performing autonomous reaping travel on the unreaped area A2 in the field F2 as a work area, the field information setting unit 60 automatically or manually sets the field information such as a field shape, position information on the field edge, a shape of the unreaped area A2, position information on the unreaped area A2, a row direction of the plurality of rows in the unreaped area A2, a row arranging direction crossing the row direction, the total number of rows of the plurality of rows, etc. Furthermore, for performing autonomous reaping travel on each split area Da, Db, Dc as a work area, the field information setting unit 60 automatically or manually sets the field information such as position information on middle-splitting Ca and Cb, a shape of and position information on each split area Da, Db, Dc, the total number of rows in each split area Da, Db, Dc, etc.

Next, based on the field information set by the field information setting unit 60, the travel route generation unit 61 generates a travel route P2 for autonomous traveling and autonomous reaping in the unreaped area A2 by forward and backward reaping travel as illustrated in FIG. 11 and stores it in the memory unit 51. FIG. 11 illustrates an example that the unreaped area A2 has split areas Da, Db, and Dc with the total number of rows of 31 to 36 and autonomous reaping travel is performed on the split areas Da, Db, and Dc in this order. In this example, a travel route Pa is generated with six straight paths Ra1 to Ra6 set to the split area Da, a travel route Pb is generated with six straight paths Rb1 to Rb6 set to the split area Db, and a travel route Pc is generated with six straight paths Rc1 to Rc6 set to the split area Dc. In the split areas Da, Db, and Dc, paths Ra1, Rb1, and Rd1 are the start paths, and paths Ra6, Rb6, and Rc6 are the last paths, respectively. The travel route generation unit 61 then generates a travel route P2 for the unreaped area A2 by connecting the travel route Pa for the split area Da, the travel route Pb for the split area Db, and the travel route Pb for the split area Db.

Figure 12:
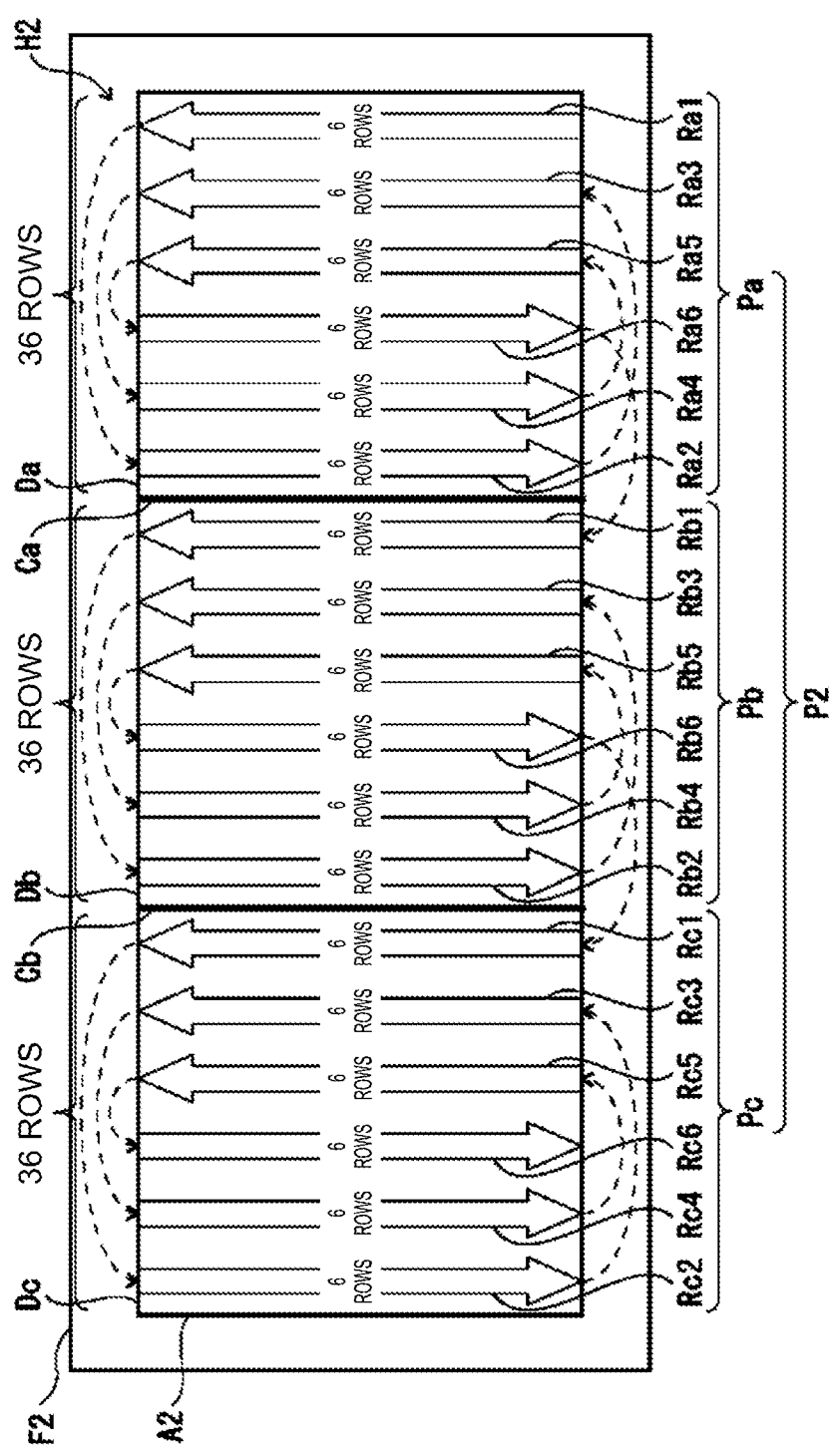
FIG. 12 is a plan view illustrating a field associated with a fourth operation example of the combine harvester according to the exemplary embodiment of the present invention, together with a travel route.

In terms of this second example, a fourth operation example when the total number of rows in each split area Da, Db, Dc is a multiple of the maximum number of reaping rows, for example, when the total number of rows in each split area is 36 rows while the maximum number of reaping rows in each split area Da, Db, Dc is 6 rows will be described with reference to FIG. 12.

In this fourth operation example, as the first setting operation, the travel route generation unit 61 first divides the total number of rows in the split area Da (36 rows) by the maximum number of reaping rows (6 rows) (first division). The result of this first division shows that the quotient is 6 and the remainder is 0. The travel route generation unit 61 determines a plurality of paths by setting the number of paths to 6, and generates a travel route Pa to travel back and forth over the 6 paths Ra1 to R6a (see FIG. 11). The travel route generation unit 61 then sets the maximum number of reaping rows (6 rows) to each path Ra1 to Ra6, as illustrated in FIG. 12.

For the split areas Db and Dc, the travel routes Pb and Pc are also generated in the same way as in the fourth operation example described above, as illustrated in FIG. 12.

Figure 13:
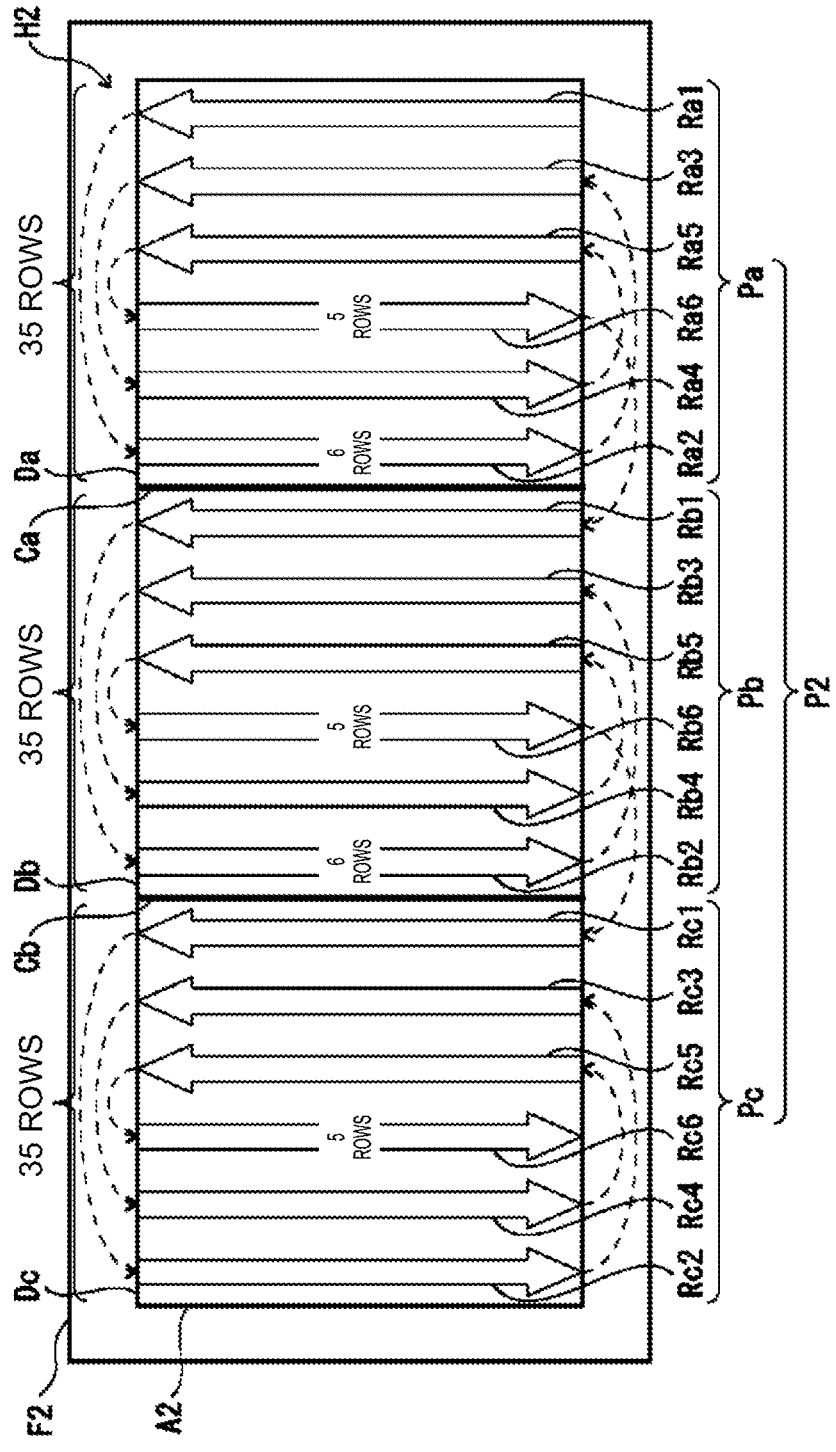
FIG. 13 is a plan view illustrating the field associated with a fifth operation example of the combine harvester according to the exemplary embodiment of the present invention, together with a travel route when tentatively setting the lower limit number of reaping rows.
Figure 14:
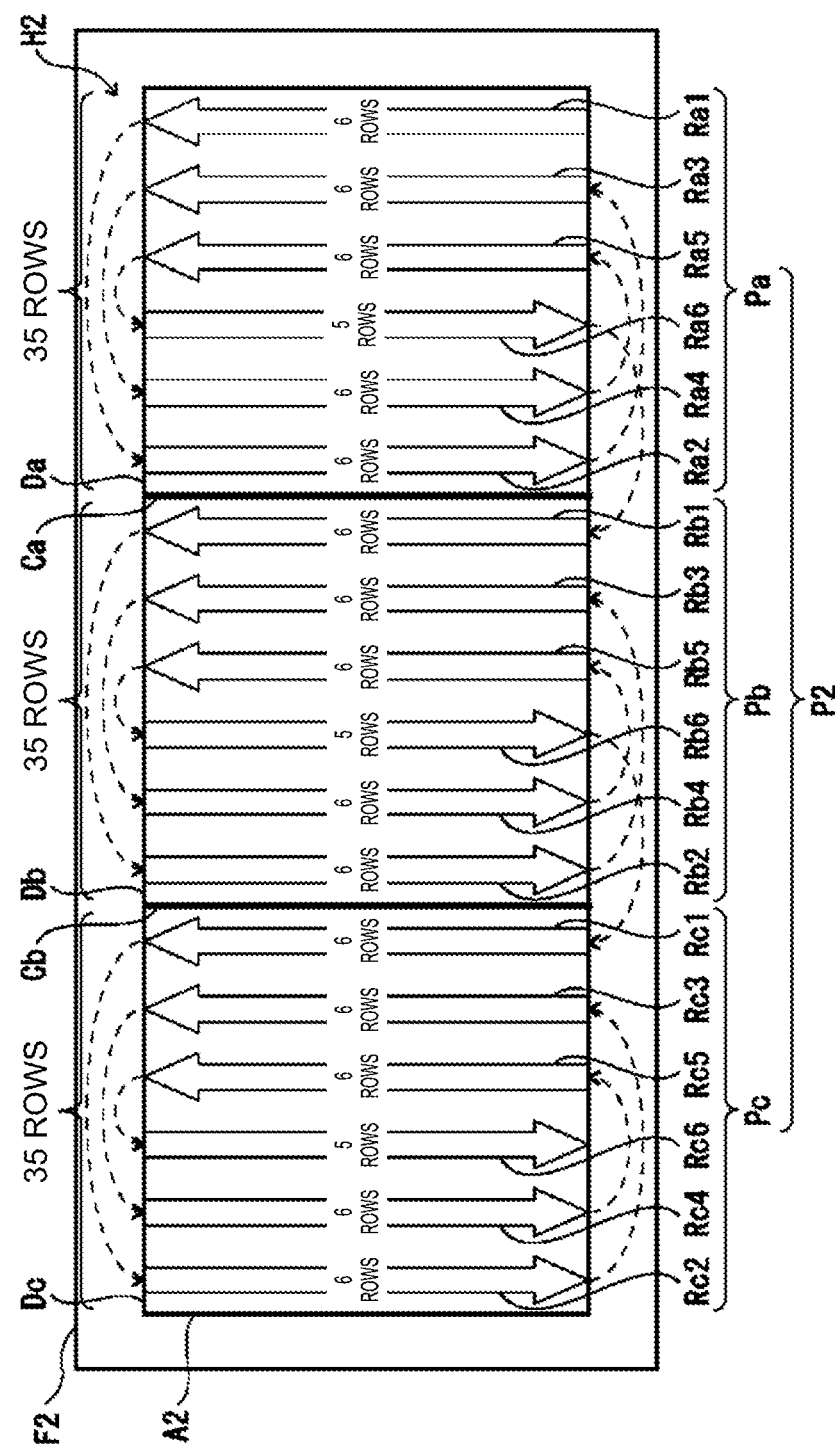
FIG. 14 is a plan view illustrating the field associated with the fifth operation example of the combine harvester according to the exemplary embodiment of the present invention, together with the travel route.

Furthermore, in terms of the second example, a fifth operation example when the total number of rows in each split area Da, Db, Dc is not a multiple of the maximum number of reaping rows, for example, when the total number of rows is 35 rows while the maximum number of reaping rows in each split area Da, Db, Dc is 6 rows will be described with reference to FIGS. 13 and 14.

In this fifth operation example, as the first setting operation, the travel route generation unit 61 first divides the total number of rows in the split area Da (35 rows) by the maximum number of reaping rows (6 rows) (first division). The result of this first division shows that the quotient is 5 and the remainder is 5. As the second setting operation, the travel route generation unit 61 determines a plurality of paths by setting the number of paths to 6 by adding 1 to the remainder '5', and generates a travel route Pa so as to travel back and forth over the 6 paths Ra1 to Ra6 (see FIG. 11). Then, as illustrated in FIG. 13, the travel route generation unit 61 sets the maximum number of reaping rows (6 rows)

to the middle-split path Ra2 and tentatively sets the lower limit number of reaping rows (5 rows) to the last path Ra6, since the path Ra2 along the middle-splitting will have an unreaped area on the right side of the body of the combine harvester 1.

Furthermore, the travel route generation unit 61 divides the number of remaining rows (24 rows) other than those in the middle-split path Ra2 to which the maximum number of reaping rows (6 rows) is set and the last path Ra6 to which the lower limit number of reaping rows (5 rows) is set, by the maximum number of reaping rows (6 rows) (second division). Since the result of this second division shows that the remainder (the number of excess rows) is 0 that is within the difference (1 row) between the maximum number of reaping rows (5 rows) and the lower limit number of reaping rows (5 rows), the travel route generation unit 61 sets, as illustrated in FIG. 14, the number of addition result rows (5 rows) obtained by adding the lower limit number of reaping rows (5 rows) and the number of excess rows (0 rows) to the last path Ra6, while setting the maximum number of reaping rows (6 rows) to each remaining path Ra1, Ra3 to Ra5 other than the middle-split path Ra2 and the last path Ra6.

For the split areas Db and Dc, the travel routes Pb and Pc are generated in the same way as in the fifth operation example described above, as illustrated in FIG. 14. However, since the split area Dc does not have a middle-split path having an unreaped area on the right side of the body of the combine harvester 1, the travel route Pc is generated in the same way as in the second operation example of the first example, regardless of the middle-split path.

Figure 15:
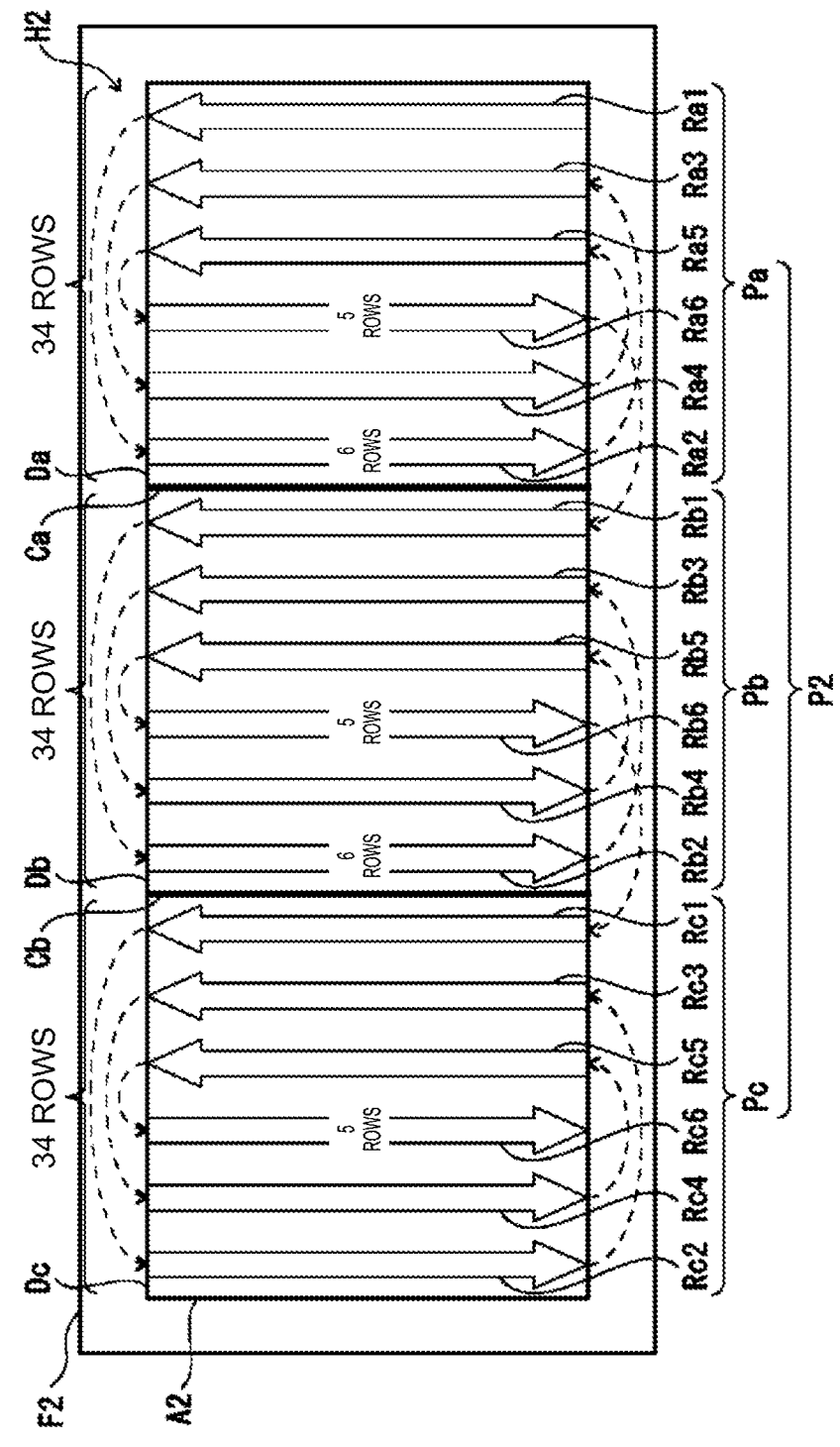
FIG. 15 is a plan view illustrating the field associated with a sixth operation example of the combine harvester according to the exemplary embodiment of the present invention, together with a travel route when tentatively setting the lower limit number of reaping rows.
Figure 16:
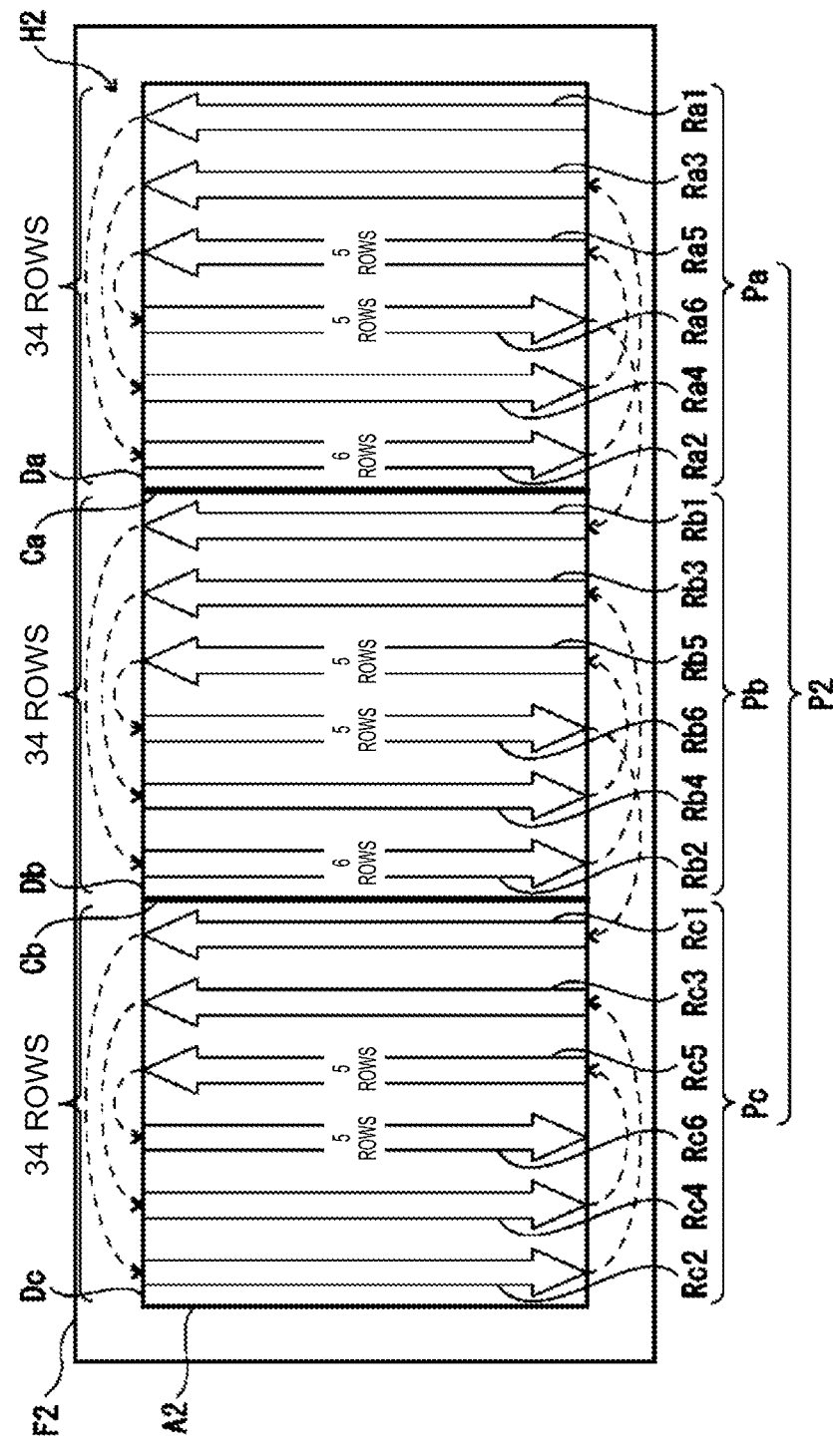
FIG. 16 is a plan view illustrating the field associated with the sixth operation example of the combine harvester according to the exemplary embodiment of the present invention, together with the travel route when tentatively setting the lower limit number of reaping rows.

Furthermore, in terms of the second example, a sixth operation example when the total number of rows of each split area Da, Db, Dc is 34 rows while the maximum number of reaping rows is 6 rows will be described with reference to FIGS. 15 through 17.

In this sixth operation example, as the first setting operation, the travel route generation unit 61 first divides the total number of rows in the split area Da (34 rows) by the maximum number of reaping rows (6 rows) (first division). The result of this first division shows that the quotient is 5 and the remainder is 4. As the second setting operation, the travel route generation unit 61 determines a plurality of paths by setting the number of paths to 6 by adding 2 to the remainder 4, and generates a travel route Pa so as to travel back and forth over the 6 paths Ra1 to Ra6 (see FIG. 11). Then, as illustrated in FIG. 15, the travel route generation unit 61 sets the maximum number of reaping rows (6 rows) to the middle-split path Ra2 and tentatively sets the lower limit number of reaping rows (5 rows) to the last path Ra6.

Furthermore, the travel route generation unit 61 divides the number of remaining rows (23 rows) other than those in the middle-split path Ra2 to which the maximum number of reaping rows (6 rows) is set and the last path Ra6 to which the lower limit number of reaping rows (5 rows) is set, by the maximum number of reaping rows (6 rows) (second division). Since the result of the second division shows that the remainder (the number of excess rows) is 5 that is not within the difference (1 row) between the maximum number of reaping rows (6 rows) and the lower limit number of reaping rows (5 rows), as the third setting operation, the travel route generation unit 61 tentatively sets, as illustrated in FIG. 16, the lower limit number of reaping rows (5 rows) to the adjustment paths that include the last path Ra6 and the first previous path Ra5 therefrom in a state in which the maximum number of reaping rows (6 row) is set to the middle-split path Ra2, and divides the number of remaining rows (18 rows) other than those in the middle-split path Ra2 and the adjustment paths, by the maximum number of reaping rows (6 rows) (follow-up second division).

Figure 17:
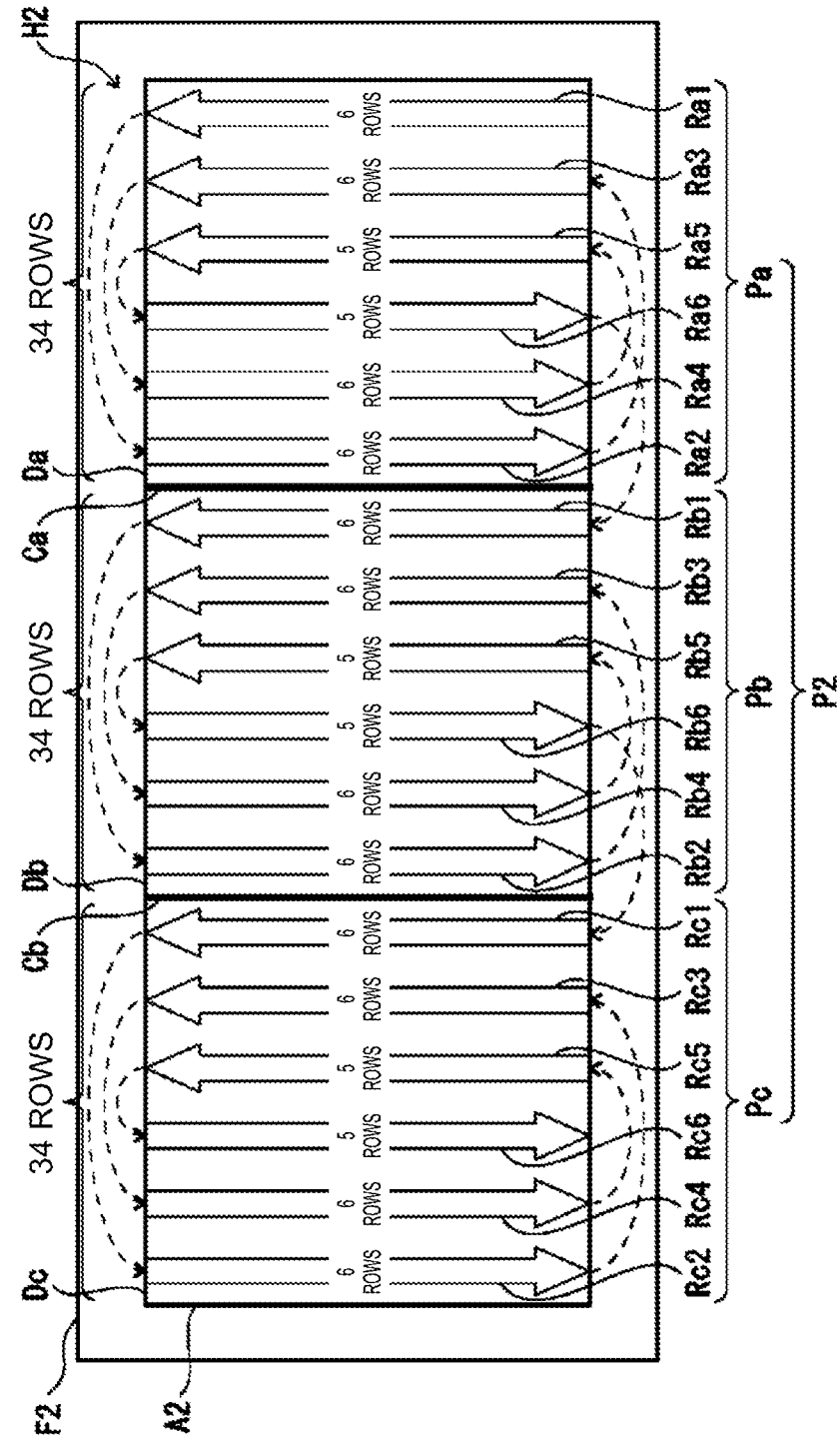
FIG. 17 is a plan view illustrating the field associated with the sixth operation example of the combine harvester according to the exemplary embodiment of the present invention, together with the travel route.

Since the result of this follow-up second division shows that the remainder (the number of excess rows) is 0 that is within the difference (1 row) between the maximum number of reaping rows (5 rows) and the lower limit number of reaping rows (5 rows), the travel route generation unit 61 sets, as illustrated in FIG. 17, the number of addition result rows (5 rows) obtained by adding the lower limit number of reaping rows (5 rows) and the number of excess rows (0 rows) to the last path Ra6 (or the first previous path Ra5 therefrom) of the adjustment paths, sets the lower limit number of reaping rows (5 rows) to the first previous path Ra5 in the adjustment paths (or the last path Ra6), and sets the maximum number of reaping rows (6 rows) to each remaining path Ra1 and Ra3 to Ra4 other than the middle-split path Ra2 and the adjustment paths.

If the total number of rows in the split area Da is 33 to 31, the third setting operation is repeated in the sixth operation example described above.

For the split areas Db and Dc, the travel routes Pb and Pc are also generated in the same way as in the sixth operation example described above, as illustrated in FIG. 17. However, since the split area Dc does not have a middle-split path having an unreaped area on the right side of the body of the combine harvester 1, the travel route Pc is generated in the same way as in the third operation example of the first example, regardless of the middle-split path.

As described above, according to the present exemplary embodiments, the combine harvester 1 includes the control device 50, and the control device 50 functions as the travel route generation unit 61 that generates a travel route corresponding to the field and the automatic operation control unit 62 that controls autonomous travel and autonomous reaping through the travel route. The travel route generation unit 61 generates the travel route by setting a lower limit number of reaping rows or more to each path based on total number of rows in a work area, the maximum number of reaping rows, and a lower limit number of reaping rows, when generating a travel route for autonomous reaping travel for the work area having a plurality of rows of a field in a manner traveling back and forth over plurality of paths along a row direction.

For the combine harvester 1, when reaping work is performed on rows relatively less than the maximum number of reaping rows, there is a risk of defective conditions such as reduced threshing accuracy, entrapment of discharged straw, etc. However, according to the present exemplary embodiments, the combine harvester 1 does not perform reaping work on fewer rows than the lower limit number of reaping rows, so that the defective conditions such as reduced threshing accuracy and entrapment of discharged straw are able to be suppressed, and therefore, efficient autonomous reaping travel is achieved.

Furthermore, in the combine harvester 1 of the exemplary embodiments, the travel route generation unit 61 divides the number of remaining rows, which is obtained when the lower limit number of reaping rows is set to the last path in the work area, by the maximum number of reaping rows (second division in the second setting operation). Then, if the number of excess rows that is obtained as the division result is within the difference between the maximum number of reaping rows and the lower limit number of reaping rows, the travel route generation unit 61 sets the number of addition result rows obtained by adding the lower limit number of reaping rows and the number of excess rows to the last path while setting the maximum number of reaping rows to each remaining path other than the last path, to generate a travel route.

Furthermore, in the combine harvester 1 of the exemplary embodiments, if the number of excess rows obtained as the division result exceeds the difference between the maximum number of reaping rows and the lower limit number of reaping rows, the travel route generation unit 61 divides the number of remaining rows when the lower limit number of reaping rows is set to the adjustment paths that include the last path and a further path, by the maximum number of reaping rows (follow-up second division in the third setting operation). Then, if the number of excess rows that is obtained as the division result is within the difference between the maximum number of reaping rows and the lower limit number of reaping rows, the travel route generation unit 61 sets the number of addition result rows obtained by adding the lower limit number of reaping rows and the number of excess rows or the lower limit number of reaping rows to the adjustment paths while setting the maximum number of reaping rows to each remaining path, to generate a travel route.

In the combine harvester 1 of the present exemplary embodiment, the travel route generation unit 61 preferably includes a predetermined number of path(s) selected back from the last path into the adjustment path as the further path.

As a result, the combine harvester 1 is able to realize a process of performing reaping work by reaping with the maximum number of reaping rows in the first half of autonomous reaping travel and performing reaping work by reaping with the lower limit number of reaping rows less than the maximum number of reaping rows in the second half, as in the case of manual reaping. Furthermore, when the combine harvester 1 performs autonomous reaping travel while considering a remaining fuel amount in the engine 27 of the power output part 8 and a grain storage amount in the grain tank 24 of the reservoir 6, the amount of remaining fuel and the grain storage amount are easily grasped because the paths for performing reaping work with the maximum number of reaping rows continue throughout the entire autonomous reaping travel. Furthermore, the combine harvester 1 may adjust the remaining fuel amount and the grain storage amount in the last path over which reaping work is performed with the lower limit number of reaping rows.

Figure 18:
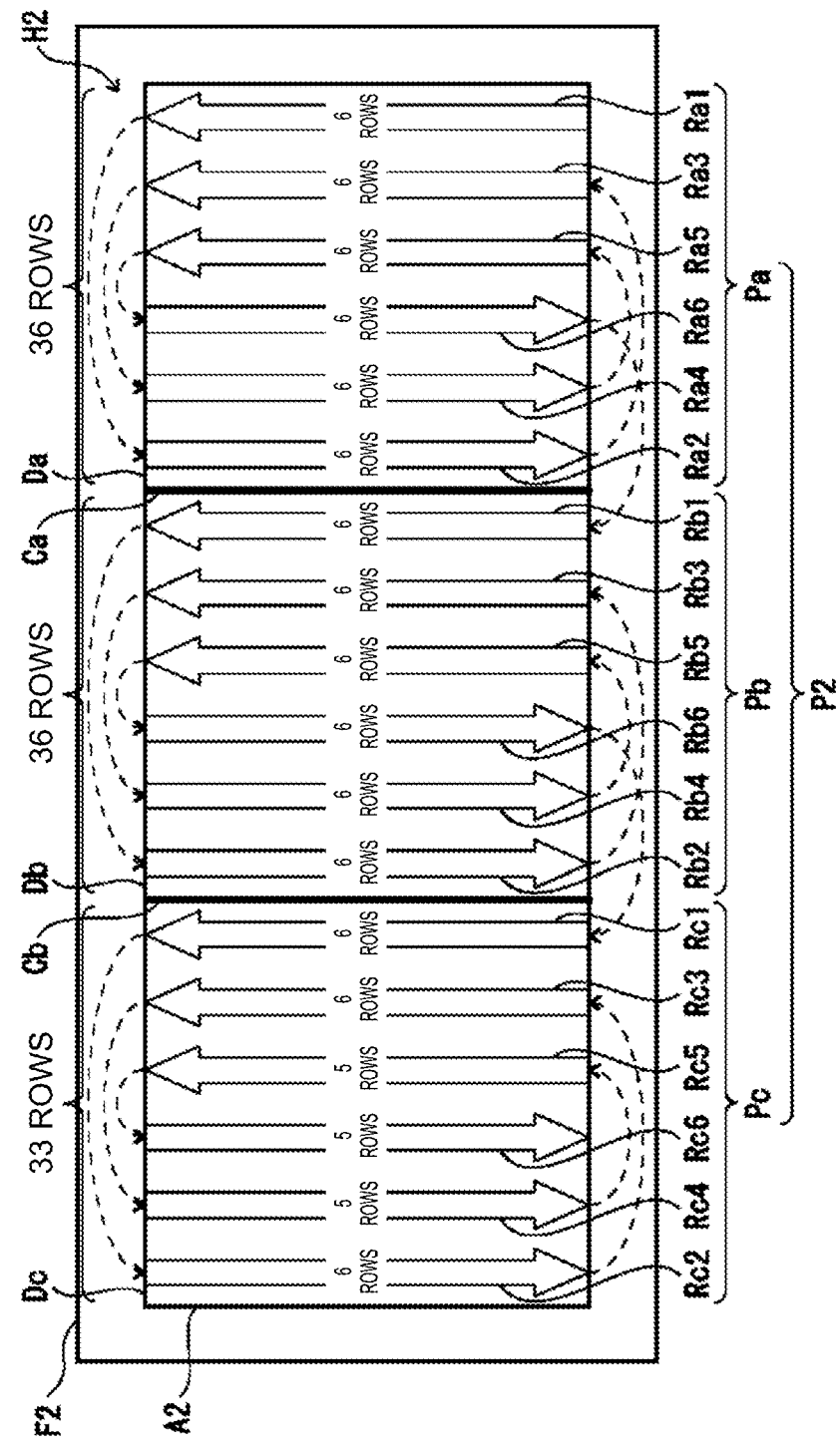
FIG. 18 is a plan view illustrating a field associated with an operation example of the combine harvester according to another exemplary embodiment of the present invention, together with a travel route.

For the exemplary embodiment described above, an example was described in which the combine harvester 1 adjusts the number of reaping rows for each of the plurality of split areas which has been are split by middle-splitting, but the invention is not limited to this example, and the combine harvester 1 may also adjust the number of reaping rows for the entire field. According to another exemplary embodiment, the combine harvester 1 may adjust the number of reaping rows in a predetermined number of paths selected back from the last path in the entire field, while basically setting the maximum number of reaping rows to each path. For example, as illustrated in FIG. 18, if the total number of rows in the field F2 is 105 while the maximum number of the reaping rows is 6, the combine harvester 1 sets the lower limit number of reaping rows to the predetermined number of paths selected back from the last path Rc6 in the entire field and also sets the maximum number of reaping rows to the paths other than the paths of the lower limit number of reaping rows. Specifically, the combine harvester 1 sets the lower limit number of reaping rows (5 rows) to the three rows Rc6, Rc5, and Rc4 previous from the last path Rc6 in the split area Dc that has the last path Rc6 of the entire field, and sets the maximum number of reaping rows (6 rows) to each of the other paths in the split area Dc and to each path in the split areas Da and Db. When the combine harvester 1 adjusts the number of reaping rows for the entire field, the split area to which the lower limit number of reaping rows is set is not limited to the split area Dc, but it may be the split area Da or Db.

For the exemplary embodiment described above, an example was described in which the combine harvester 1 sets the lower limit number of reaping rows to the last path and/or a predetermined number of paths previous from the last row, but the present invention is not limited to this example. For example, according to another exemplary embodiment, for a path over which a reaped area is located on the right side of the combine harvester 1 or a path over which a reaped area is located on the front right side of the combine harvester 1, the lower limit number of reaping rows the combine harvester 1 may set the lower limit number of reaping rows to a path in the first half of the autonomous reaping travel or automatic reaping run or the middle path, of the automatic reaping run, without limiting to a path near the last path (i.e., a path in the second half of the autonomous reaping travel.

In the combine harvester 1 according to the present embodiment, the travel route generation unit 61 regards the split areas which has been split according to a predetermined times of middle-splitting of the field as a work area, and sets the maximum number of reaping rows to a middle-split path along the middle-splitting. Furthermore, the travel route generation unit 61 divides the number of remaining rows of the split area when the lower limit number of reaping rows is set to the last path in each split area, by the maximum number of reaping rows (second division in the second setting operation). Then, if the number of excess rows that is obtained as the division result is within the difference between the maximum number of reaping rows and the lower limit number of reaping rows, the travel route generation unit 61 sets the number of addition result rows obtained by adding the lower limit number of reaping rows and the number of excess rows to the last path while setting the maximum number of reaping rows to each remaining path of the split area, to generate a travel route. On the other hand, if the number of excess rows obtained as the division result exceeds the difference between the maximum number of reaping rows and the lower limit number of reaping rows, the travel route generation unit 61 divides the number of remaining rows of the split area when the lower limit number of reaping rows is set to the adjustment paths that include the last path and a further path, by the maximum number of reaping rows (follow-up second division in the second setting operation). Then, if the number of excess rows that is obtained as the division result is within the difference between the maximum number of reaping rows and the lower limit number of reaping rows, the travel route generation unit 61 sets the number of addition result rows obtained by adding the lower limit number of reaping rows and the number of excess rows or the lower limit number of reaping rows to the adjustment paths while setting the maximum number of reaping rows to the remaining path of the split area, to generate a travel route.

As a result, the combine harvester 1 is able to realize a process of performing reaping work by reaping with the maximum number of reaping rows in the first half in each split area and performing reaping work by reaping with the lower limit number of reaping rows less than the maximum number of reaping rows in the second half. Furthermore, when the combine harvester 1 performs autonomous reaping travel while considering a remaining fuel amount in the engine 27 of the power output part 8 and a grain storage amount in the grain tank 24 of the reservoir 6, the amount of remaining fuel and the grain storage amount are easily grasped because the paths for performing reaping work with the maximum number of reaping rows continue in each split area. Furthermore, the combine harvester 1 may adjust the remaining fuel amount and the grain storage amount in the last path over which reaping work is performed with the lower limit number of reaping rows of each split area.

Preferably, in the combine harvester 1 of the exemplary embodiment, the travel route generation unit 61 generate a travel route by setting an even number of paths to the split area.

This allows the entrance and exit of each split area to be located on the same side, thereby shortening the empty travel route between split areas.

In the exemplary embodiment described above, an example of the combine harvester 1 configured as a head-feeding combine harvester was described. However, the present invention is not limited to this example, and the combine harvester 1 may be configured as an ordinary-type combine harvester. In the exemplary embodiment described above, FIGS. 4 through 17 illustrates an example of turning the empty travel route between paths with a U-turn, but the present invention is not limited to this example, and the empty travel route between paths may be turned with other turning methods such as a fishtail turn.

The present invention can be properly modified to the extent that it does not contradict the invention's gist or idea that can be read from the claims and the entire specification, and the combine harvester and the travel route generation method with the above modification are also included in the technical concept of the present invention.

DESCRIPTION OF REFERENCE NUMERALS

1 Combine harvester
2 Traveling part
3 Reaping part
34 Mobile station
39 Base station
50 Control device
51 Memory unit
52 Communication unit
53 Portable terminal
60 Field information setting unit
61 Travel route generation unit
62 Automatic operation control unit

The invention claimed is:

1. A combine harvester comprising:
a reaping part configured to reap grain culms;
a travel route generation unit configured to:
   set a lower limit number of reaping rows that is less than a maximum number of reaping rows of the reaping part; and
   generate, subsequent to the lower limit number of reaping rows being set and for a work area having a plurality of rows of grain culms of a field, a travel route along which the combine harvester can autonomously travel and autonomously reap in the work area,
wherein generating the travel route includes setting, for each respective path of a plurality of paths of the travel route, a number of reaping rows for the respective path that is greater than or equal to the lower limit number of reaping rows based on a total number of rows of grain culms in the work area, the maximum number of reaping rows of the reaping part, and the lower limit number of reaping rows; and
an automatic operation control unit configured to control autonomous travel and autonomous reaping through the travel route.

2. The combine harvester according to claim 1, wherein the travel route generation unit is further configured to:
divide a number of remaining rows of grain culms by the maximum number of reaping rows to obtain a division result including a remainer that indicates a number of excess rows, the number of remaining rows being a difference between the total number of rows of grain culms and the lower limit number of reaping rows set; and
if the number of excess rows is less than a difference between the maximum number of reaping rows and the lower limit number of reaping rows, generating the travel route includes:
   setting a number of addition result rows, obtained by adding the lower limit number of reaping rows and the number of excess rows, to the last path; and
   setting the maximum number of reaping rows to each path of the plurality of paths other than the last path.

3. The combine harvester according to claim 2, wherein generating the travel route includes:
setting the lower limit number of reaping rows to the last path and one or more paths immediately preceding the last path; and
if the number of excess rows is greater than the difference between the maximum number of reaping rows and the lower limit number of reaping rows, dividing a number of remaining rows of a split area by the maximum number of reaping rows, wherein the split area includes an area of the field at which an unreaped area of the field is split; or
if the number of excess rows is less than the difference between the maximum number of reaping rows and the lower limit number of reaping rows:
   setting the number of addition result rows or the lower limit number of reaping rows to the last path and the one or more paths immediately preceding the last path; and
   setting the maximum number of reaping rows to each remaining path.

4. The combine harvester according to claim 3, wherein the one or more paths immediately preceding the last path are selected sequentially back from the last path based on a predetermined number of paths.

5. The combine harvester according to claim 1, wherein the travel route generation unit is further configured to:
identify a split area of a plurality of split areas of the work area, the work area having been split into the plurality of split areas according to a predetermined number of times of middle-splitting of the work area;
set the maximum number of reaping rows to a middle-split path of the plurality of paths, the middle-split path being in the split area along the middle-splitting;
set the lower limit number of reaping rows to a last path of the plurality of paths, the last path being in the split area; and
divide a number of remaining rows of the split area by the maximum number of reaping rows to obtain a division result including a remainder that indicates a number of excess rows, the number of remaining rows of the split area being a difference between a total number of rows of grain culms in the split area and a sum of the maximum number of reaping rows and the lower limit number of reaping rows, wherein if the lower limit number of reaping rows is set to only the last path, generating the travel route includes:

if the number of excess rows is less than a difference between the maximum number of reaping rows and the lower limit number of reaping rows:

determining a number of addition result rows by adding the lower limit number of reaping rows and the number of excess rows;

setting the number of addition result rows to the last path; and setting the maximum number of reaping rows to each path in the split area other than the middle-split path and the last path; and wherein if the lower limit number of reaping rows is set to the last path and to one or more paths immediately preceding the last path, generating the travel route includes:

if the number of excess rows is greater than the difference between the maximum number of reaping rows and the lower limit number of reaping rows:

dividing a second number of remaining rows of the split area by the maximum number of reaping rows, the second number of remaining rows of the split area being a difference between a total number of rows of grain culms in the split area and a sum of the maximum number of reaping rows set to the middle-split path, the lower limit number of reaping rows set to the last path and the lower limit number of reaping rows set to the one or more paths immediately preceding the last path; and if the number of excess rows is less than the difference between the maximum number of reaping rows and the lower limit number of reaping rows:

setting the number of addition result rows or the lower limit number of reaping rows to the last path and the one or more paths immediately preceding the last path; and setting the maximum number of reaping rows to each path in the split area other than the middle-split path, the last path, and the one or more paths immediately preceding the last path.

6. The combine harvester according to claim 5, wherein, to generate the travel route, the travel route generation unit is further configured to set an even number of paths to the split area.

7. A travel route generation method comprising:

setting a lower limit number of reaping rows that is less than a maximum number of reaping rows of a reaping part;

generating, subsequent to setting the lower limit number of reaping rows and for a work area having a plurality of rows of grain culms of a field, a travel route along which a combine harvester can perform autonomous travel and autonomous reaping, wherein generating the travel route includes setting, for each respective path of a plurality of paths of the travel route, a number of reaping rows for the respective path based on a total number of rows of grain culms in the work area, a maximum number of reaping rows of a reaping part of the combine harvester, and the lower limit number of reaping rows; and controlling autonomous travel and autonomous reaping of the combine harvester along the travel route.

8. The travel route generation method according to claim 7, wherein generating the travel route includes:

dividing a number of remaining rows of grain culms by the maximum number of reaping rows to obtain a division result including a remainder that indicates a number of excess rows, the number of remaining rows being a difference between the total number of rows of grain culms and the lower limit number of reaping rows set, and with the number of excess rows being less than a difference between the maximum number of reaping rows and the lower limit number of reaping rows, generating the travel route includes:

setting a number of addition result rows, obtained by adding the lower limit number of reaping rows and the number of excess rows, to the last path; and setting the maximum number of reaping rows to each path of the plurality of paths other than the last path.

9. The travel route generation method according to claim 7, wherein generating the travel route includes:

setting the lower limit number of reaping rows to one or more paths immediately preceding the last path; and with the number of excess rows being greater than a difference between the maximum number of reaping rows and the lower limit number of reaping rows, dividing a number of remaining rows of a split area is by the maximum number of reaping rows, wherein the split area includes an area of the field at which an unreaped area of the field is split.

10. The travel route generation method according to claim 9, wherein the one or more paths immediately preceding the last path are selected sequentially back from the last path based on a predetermined number of paths.

11. The travel route generation method according to claim 7, comprising identifying a split area of a plurality of split areas of the work area, the work area having been split into the plurality of split areas according to a predetermined number of times of middle-splitting of the work area, and wherein generating the travel route comprises:

setting the maximum number of reaping rows to a middle-split path of the plurality of paths, the middle-split path being in the split area along the middle-splitting;

setting the lower limit number of reaping rows to a last path of the plurality of paths, the last path being in the split area;

dividing a number of remaining rows of the split area by the maximum number of reaping rows to obtain a division result including a remainder that indicates a number of excess rows, the number of remaining rows of the split area being a difference between a total number of rows of grain culms in the split area and a sum of the maximum number of reaping rows and the lower limit number of reaping rows, if the lower limit number of reaping rows is set to only the last path:

if the number of excess rows is less than a difference between the maximum number of reaping rows and the lower limit number of reaping rows:

determining a number of addition result rows by adding the lower limit number of reaping rows and the number of excess rows;

setting the number of addition result rows to the last path; and setting the maximum number of reaping rows to each path in the split area other than the middle-split path and the last path.

12. The travel route generation method according to claim 11, wherein generating the travel route includes setting an even number of paths to the split area.

13. The combine harvester according to claim 1, wherein the lower limit number of reaping rows is a minimum number of reaping rows that can be set for a path of the plurality of paths.

14. The travel route generation method according to claim 7, wherein generating the travel route includes:

setting the lower limit number of reaping rows to one or more paths immediately preceding the last path; and with the number of excess rows being less than a difference between the maximum number of reaping rows and the lower limit number of reaping rows:

setting the number of addition result rows or the lower limit number of reaping rows to the last path and the one or more paths immediately preceding the last path, and setting the maximum number of reaping rows to each remaining path.

15. The travel route generation method according to claim 7, comprising identifying a split area of a plurality of split areas of the work area, the work area having been split into the plurality of split areas according to a predetermined number of times of middle-splitting of the work area, and wherein generating the travel route comprises:

setting the maximum number of reaping rows to a middle-split path of the plurality of paths, the middle-split path being in the split area along the middle-splitting;

setting the lower limit number of reaping rows to a last path of the plurality of paths, the last path being in the split area;

dividing a number of remaining rows of the split area by the maximum number of reaping rows to obtain a division result including a remainder that indicates a number of excess rows, the number of remaining rows of the split area being a difference between a total number of rows of grain culms in the split area and a sum of the maximum number of reaping rows and the lower limit number of reaping rows; and with the lower limit number of reaping rows being set to the last path and to one or more paths immediately preceding the last path and with the number of excess rows being greater than the difference between the maximum number of reaping rows and the lower limit number of reaping rows:

dividing a second number of remaining rows of the split area by the maximum number of reaping rows, the second number of remaining rows of the split area being a difference between a total number of rows of grain culms in the split area and a sum of the maximum number of reaping rows set to the middle-split path, the lower limit number of reaping rows set to the last path and the lower limit number of reaping rows set to the one or more paths immediately preceding the last path.

16. The travel route generation method according to claim 7, comprising identifying a split area of a plurality of split areas of the work area, the work area having been split into the plurality of split areas according to a predetermined number of times of middle-splitting of the work area, and wherein generating the travel route comprises:

setting the maximum number of reaping rows to a middle-split path of the plurality of paths, the middle-split path being in the split area along the middle-splitting;

setting the lower limit number of reaping rows to a last path of the plurality of paths, the last path being in the split area;

dividing a number of remaining rows of the split area by the maximum number of reaping rows to obtain a division result including a remainder that indicates a number of excess rows, the number of remaining rows of the split area being a difference between a total number of rows of grain culms in the split area and a sum of the maximum number of reaping rows and the lower limit number of reaping rows; and with the lower limit number of reaping rows being set to the last path and to one or more paths immediately preceding the last path and with the number of excess rows being less than the difference between the maximum number of reaping rows and the lower limit number of reaping rows:

setting the number of addition result rows obtained by adding the lower limit number of reaping rows and the number of excess rows or the lower limit number of reaping rows to the last path and the one or more paths immediately preceding the last path, and setting the maximum number of reaping rows to each path in the split area other than the middle-split path, the last path, and the one or more paths immediately preceding the last path.

\* \* \* \* \*